(12) United States Patent
Su et al.

(10) Patent No.: US 8,794,850 B2
(45) Date of Patent: Aug. 5, 2014

(54) ADAPTER CONFIGURED WITH BOTH OPTICAL AND ELECTRICAL CONNECTIONS FOR PROVIDING BOTH OPTICAL AND ELECTRICAL COMMUNICATIONS CAPABILITIES

(75) Inventors: Chung-Yi Su, Fremont, CA (US); Tak Kui Wang, Cupertino, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 642 days.

(21) Appl. No.: 12/848,253

(22) Filed: Aug. 2, 2010

(65) Prior Publication Data

US 2011/0243505 A1    Oct. 6, 2011

Related U.S. Application Data

(63) Continuation of application No. 12/754,545, filed on Apr. 5, 2010, now Pat. No. 8,467,654.

(51) Int. Cl.
*G02B 6/38* (2006.01)

(52) U.S. Cl.
USPC .......................................................... 385/75

(58) Field of Classification Search
None
See application file for complete search history.

(56) References Cited

U.S. PATENT DOCUMENTS

| | | |
|---|---|---|
| 5,599,206 A | 2/1997 | Slack et al. |
| 5,745,622 A | 4/1998 | Birnbaum et al. |
| 5,896,480 A | 4/1999 | Scharf et al. |
| 6,341,899 B1 | 1/2002 | Shirakawa et al. |
| 6,381,283 B1 | 4/2002 | Bhardwaj et al. |
| 6,500,026 B2 | 12/2002 | Yamaguchi |
| 6,588,938 B1 | 7/2003 | Lampert et al. |
| 7,147,519 B2 | 12/2006 | Reichle |
| 7,326,087 B2 | 2/2008 | Gerlach et al. |
| 7,488,115 B2 | 2/2009 | Theis |
| 8,011,972 B2 | 9/2011 | Caveney et al. |
| 8,376,630 B2 | 2/2013 | Wang et al. |
| 8,467,654 B2 | 6/2013 | Su et al. |
| 2005/0186822 A1 | 8/2005 | Serino et al. |
| 2006/0263011 A1* | 11/2006 | Chen et al. ...................... 385/75 |

FOREIGN PATENT DOCUMENTS

| | | |
|---|---|---|
| CN | 1244928 | 2/2000 |
| CN | 1913256 | 2/2007 |
| CN | 100388031 | 5/2008 |
| CN | 101223465 | 7/2008 |
| EP | 2075604 A1 | 7/2009 |
| TW | 445674 | 7/2001 |

OTHER PUBLICATIONS

"UTP Cable Termination Standards 568A Vs 568B" by Hamilton (Feb. 2007).*

* cited by examiner

Primary Examiner — Jerry Rahll

(57) ABSTRACT

An adapter is provided that has both an electrical coupling configuration that complies with the RJ-45 wiring standard for electrical communications and an optical coupling configuration for optical communications. The adapter is configured as an interface for at least two modular connector assemblies to enable the modular connector assemblies to communicate with each other either optically or electrically, depending on whether the plugs of the assemblies are configured to have optical or electrical communications capabilities.

20 Claims, 24 Drawing Sheets

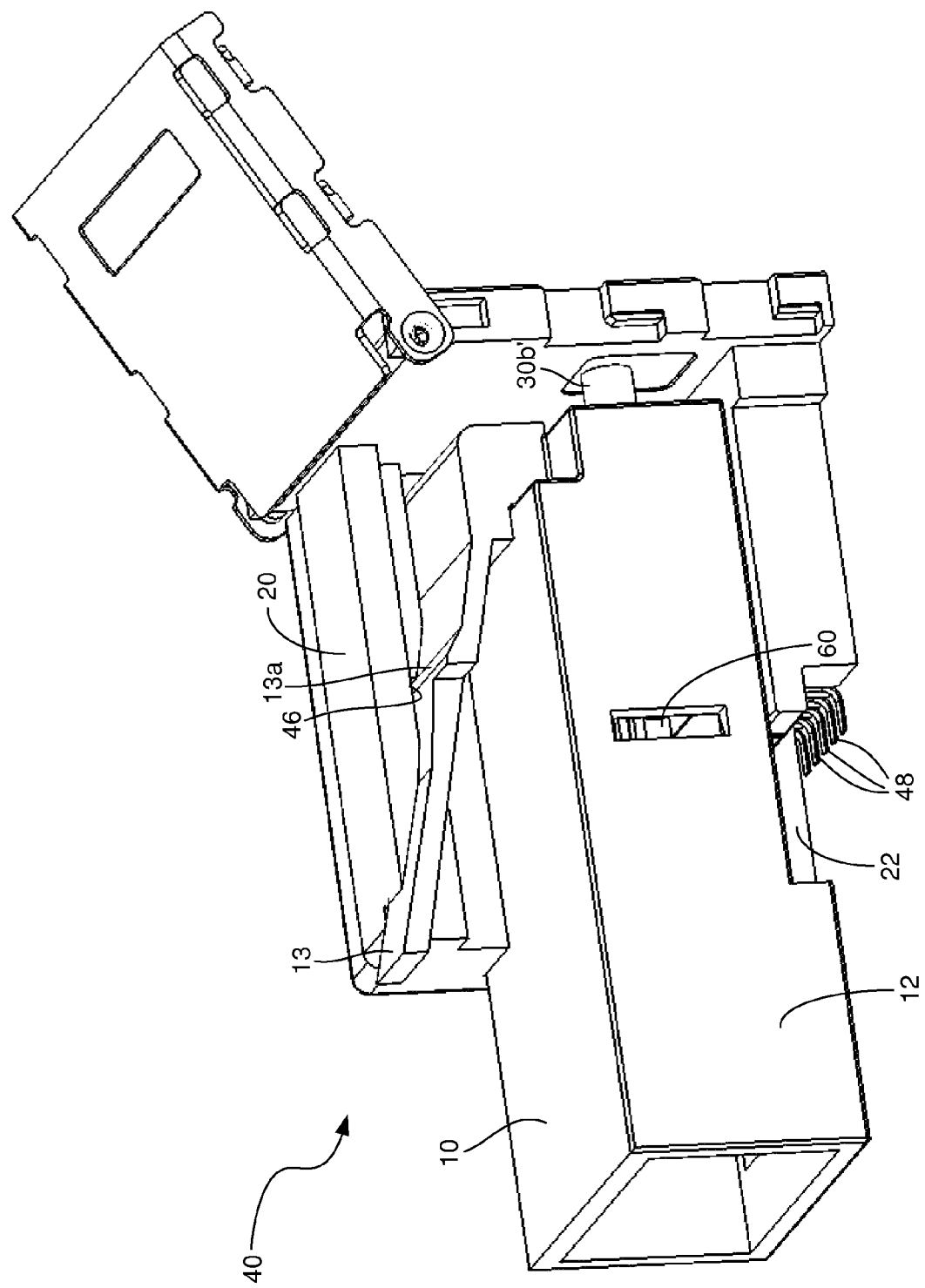

ADAPTER CONFIGURED WITH BOTH OPTICAL AND ELECTRICAL CONNECTIONS FOR PROVIDING BOTH OPTICAL AND ELECTRICAL COMMUNICATIONS CAPABILITIES

CROSS-REFERENCE TO RELATED APPLICATIONS

This application is a continuation-in-part application of application Ser. No. 12/754,545, filed on Apr. 5, 2010, entitled "A MODULAR CONNECTOR ASSEMBLY CONFIGURED WITH BOTH OPTICAL AND ELECTRICAL CONNECTIONS FOR PROVIDING BOTH OPTICAL AND ELECTRICAL COMMUNICATIONS CAPABILITIES, AND A SYSTEM THAT INCORPORATES THE ASSEMBLY", which is incorporated herein by reference in its entirety.

TECHNICAL FIELD OF THE INVENTION

The invention relates to adapters for interfacing modular connector assemblies of the type that comply with registered jack-45 (RJ-45) wiring standards. More particularly, the invention is directed to an adapter having both an electrical coupling configuration that complies with the RJ-45 wiring standard and an optical coupling configuration that provides the assembly with optical communications capabilities.

BACKGROUND OF THE INVENTION

A variety of modular connector assemblies are used to electrically couple electrical signals between the ends of electrical conductors contained in electrical cables and electrical contacts of electrical circuitry of terminal equipment connected to the ends of the cables. A modular connector assembly has a plug that terminates the end of the electrical cable and a jack that mates with the plug. The exterior surface of the plug and the interior surface of the jack have mating features located on them that mate with each other to removably interlock the plug inside of the jack. When the plug is interlocked in a mating relationship with the jack, respective electrical contacts of the plug are in contact with respective electrical contacts of the jack. The electrical contacts of the plug are electrically coupled with the ends of respective electrical conductors of the cable. Similarly, the electrical contacts of the jack are electrically coupled with respective electrical contacts of electrical circuitry of the terminal equipment. Through all of these electrical connections, electrical signals being carried on the electrical conductors of the cable are electrically coupled to the electrical circuitry of the terminal equipment, and vice versa.

One type of modular connector assembly that is well known in the communications industry is an eight position, eight contact (8P8C) modular connector assembly. The 8P8C modular connector assembly is often used with twisted copper pairs to communicate electrical data signals over Ethernet-based communications networks. In Ethernet-based communications networks, the electrical contacts and other circuitry of the 8P8C connector assembly are configured to comply with the RJ-45 wiring standards, which are called the T-568A and T-568B wiring standards. Because these types of modular connector assemblies are made to comply with the RJ-45 wiring standards when they are manufactured for use in Ethernet-based communications networks, they are often referred to as RJ-45 connectors.

FIG. 1 illustrates a perspective view of a known 8P8C plug 1 of a known 8P8C modular connector assembly. The plug 1 is configured to mate with a known jack (not shown for purposes of clarity) of the known 8P8C modular connector assembly. The 8P8C plug 1 includes electrical wiring that complies with one of the RJ-45 wiring standards, i.e., either the T-568A or T-568B wiring standard. The plug 1 has a plug housing 2, a latch mechanism 3 formed on a top portion of the plug housing 2, and a plurality of insulation displacement contacts 4 disposed on a bottom portion of the plug 2. The latch mechanism 3 has a locking feature 3a thereon that engages a locking feature of the jack (not shown) when the plug 1 is mated with the jack. The insulation displacement contacts 4 pierce the insulating jackets of twisted copper pair wires of a cable (not shown for purposes of clarity) when the plug 1 is installed on the end of the cable. The cable that is used with the plug 1 is typically a Category 5 (CAT 5) or a Category 6 (CAT 6) cable as defined by the Electronic Industries Association and Telecommunications Industry Association (EIA/TIA).

Ethernet-based communications networks currently have the capability of carrying electrical data signals at data rates in excess of 1 gigabits per second (Gb/s). Although optical communications links are currently capable of operating at date rates of 10 Gb/s over distances of up to about 100 meters (m), the use of such optical links generally has not spread into areas occupied by high-speed Ethernet-based networks. One reason that the use of optical links has not spread into this space is that the costs of manufacturing pluggable optical modular connector assemblies that can operate at these data rates are much higher than the costs of manufacturing 8P8C modular connector assemblies that operate at these data rates. Another reason that the use of optical links has not spread into this space is that there are currently no optical solutions that have backwards compatibility to the existing electrical Ethernet solutions. Although it is possible to design electrical connections that operate at data rates higher than 1 Gb/s using 8P8C modular connectors that implement the RJ-45 wiring standard, such connections would consume much more power than optical connections operating at the same data rate. In addition, the complexity of the design for such high data rate electrical connections would result in the connections being significantly more expensive than those that operate at 1 Gb/s. Furthermore, a new cabling scheme with higher costs would be required to propagate the data signals at data rates higher than 1 Gb/s over distances of about 100 meters (m).

Adapters currently exist that enable two 8P8C modular connector assemblies to be interfaced together. The existing adapter has an 8P8C jack formed in opposite ends thereof for mating with respective 8P8C plugs of the type shown in FIG. 1. When the respective 8P8C plugs are mated with the respective 8P8C jacks, the electrical wiring of the adapter electrically interconnects the two plugs. Through this electrical interconnection between the two plugs, respective wires of the cables that are terminated by the plugs are electrically interconnected, thereby allowing electrical signals being carried on the wires of one of the cables to be coupled onto the wires of the other cable.

Although the adapter described above is useful for interconnecting electrical cables that are terminated with 8P8C plugs, it cannot be used to interconnect optical cables that are terminated with optical plugs or to interconnect an electrical cable terminated with an 8P8C plug with an electrical or hybrid cable terminated with a plug that has both electrical and optical communications capabilities. A need exists for an adapter that is capable of interconnecting optical cables terminated with optical plugs, interconnecting electrical cables terminated with 8P8C plugs, or interconnecting an electrical cable terminated with an 8P8C plug with an electrical or hybrid cable terminated with a plug that has both electrical and optical communications capabilities.

SUMMARY OF THE INVENTION

The invention is directed to an adapter having multiple jacks for mating with multiple respective plugs that terminate multiple respective cables, and an adapter assembly that includes the adapter and the plugs mated with the respective jacks of the adapter. The adapter comprises an adapter housing, an optical coupling system, and an electrical conductor configuration. The adapter housing has first and second jacks formed therein and a shared partitioning member that partitions the first and second jacks from each other. The first jack comprises a first plug opening formed in a first end of the adapter and configured to receive a first plug, and a first electrical contact configuration that complies with a RJ-45 wiring standard. The second jack comprises a second plug opening formed in a second end of the adapter and configured to receive a second plug, and a second electrical contact configuration that complies with a RJ-45 wiring standard. The optical coupling system is formed in or is secured to the shared partitioning member of the adapter housing. The optical coupling system is configured to optically couple optical signals between a first side of the rear partitioning member and a second side of the rear partitioning member. The electrical conductor configuration interconnects the first and second electrical contact configurations for electrically coupling electrical signals between the first and second electrical contact configurations.

The adapter assembly comprises the adapter, first and second plugs mated with the first and second plug openings, respectively, and first and second cables terminated by the first and second plugs, respectively.

These and other features and advantages of the invention will become apparent from the following description, drawings and claims.

BRIEF DESCRIPTION OF THE DRAWINGS

FIG. 11B illustrates a cutaway view of the modular connector assembly shown in FIG. 8 with the plug shown in FIGS. 2A-2C interlocked with the jack shown in FIG. 3 in a second interlocking position for optical communications.

DETAILED DESCRIPTION OF AN EXEMPLARY EMBODIMENT

The invention is directed to an adapter having both an electrical coupling configuration that complies with the RJ-45 wiring standard for electrical communications and an optical coupling configuration for optical communications. The adapter is configured as an interface for at least two modular connector assemblies to enable the modular connector assemblies to communicate with each other either optically or electrically, depending on whether the plugs of the assemblies are configured to have optical or electrical communications capabilities. In other words, the adapter will operate as either: (1) an interface for two typical electrical-only RJ-45 plugs; (2) an interface for two plugs of the invention described below that can operate optically or electrically; or (3) an interface for a typical electrical-only RJ-45 plug and the plug of the invention described below that can operate optically or electrically. Thus, the adapter has backwards compatibility with electrical-only 8P8C plugs that implement the RJ-45 wiring standard, but can also be used with the plugs of the invention that operate optically or electrically. Thus, the adapter may be used to interface modular connector assemblies that communicate optical data signals at higher data rates (e.g., 10 Gb/s and higher) or that communicate electrical data signals at lower data rates (e.g., 1 Gb/s).

Prior to describing illustrative embodiments of the adapter of the invention, illustrative embodiments of the plug and jack of the invention that together form a modular connector assembly will be described with reference to FIGS. 2A-14. Then, illustrative embodiments of the adapter will be described with reference to FIGS. 15-21.

Figure 1:
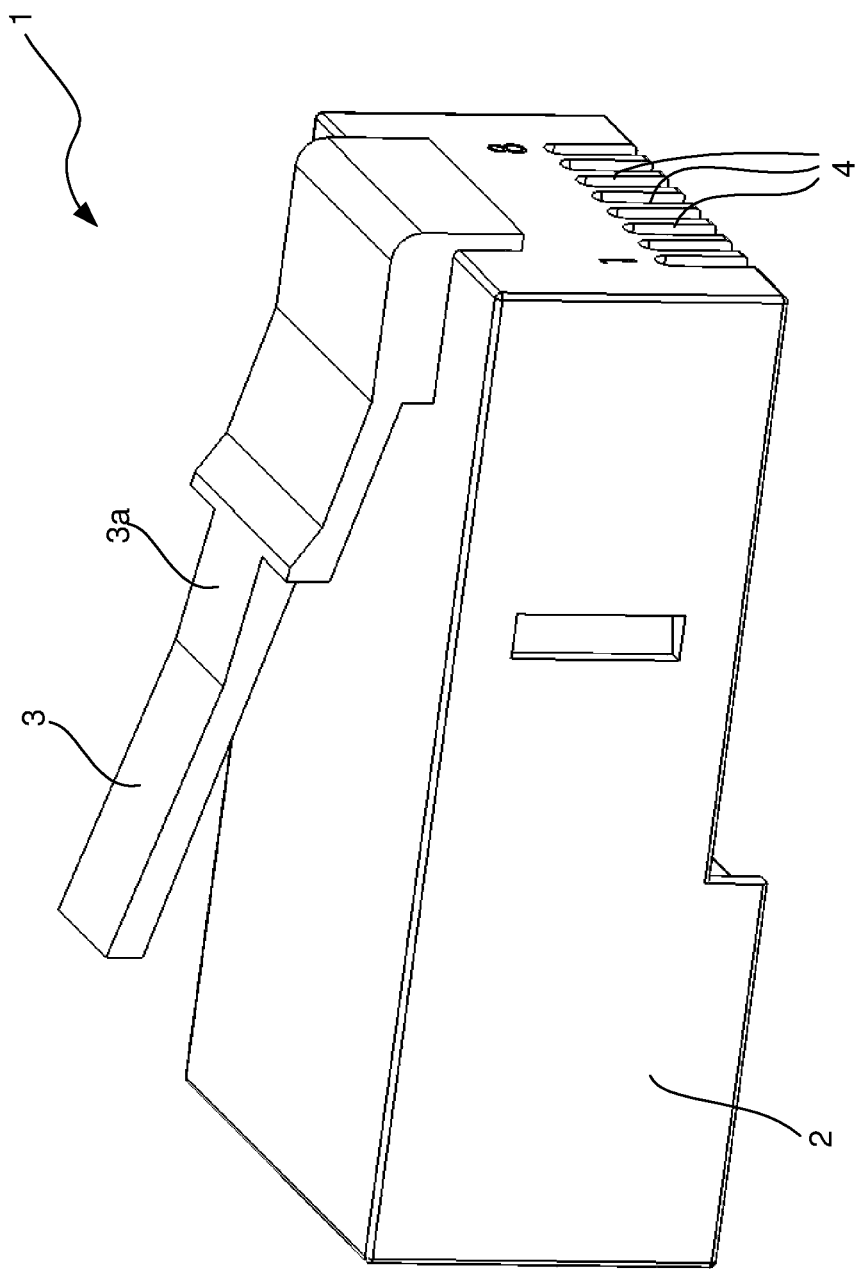
FIG. 1 illustrates a perspective view of a known 8P8C plug used in electrical Ethernet communications.
Figure 2A:
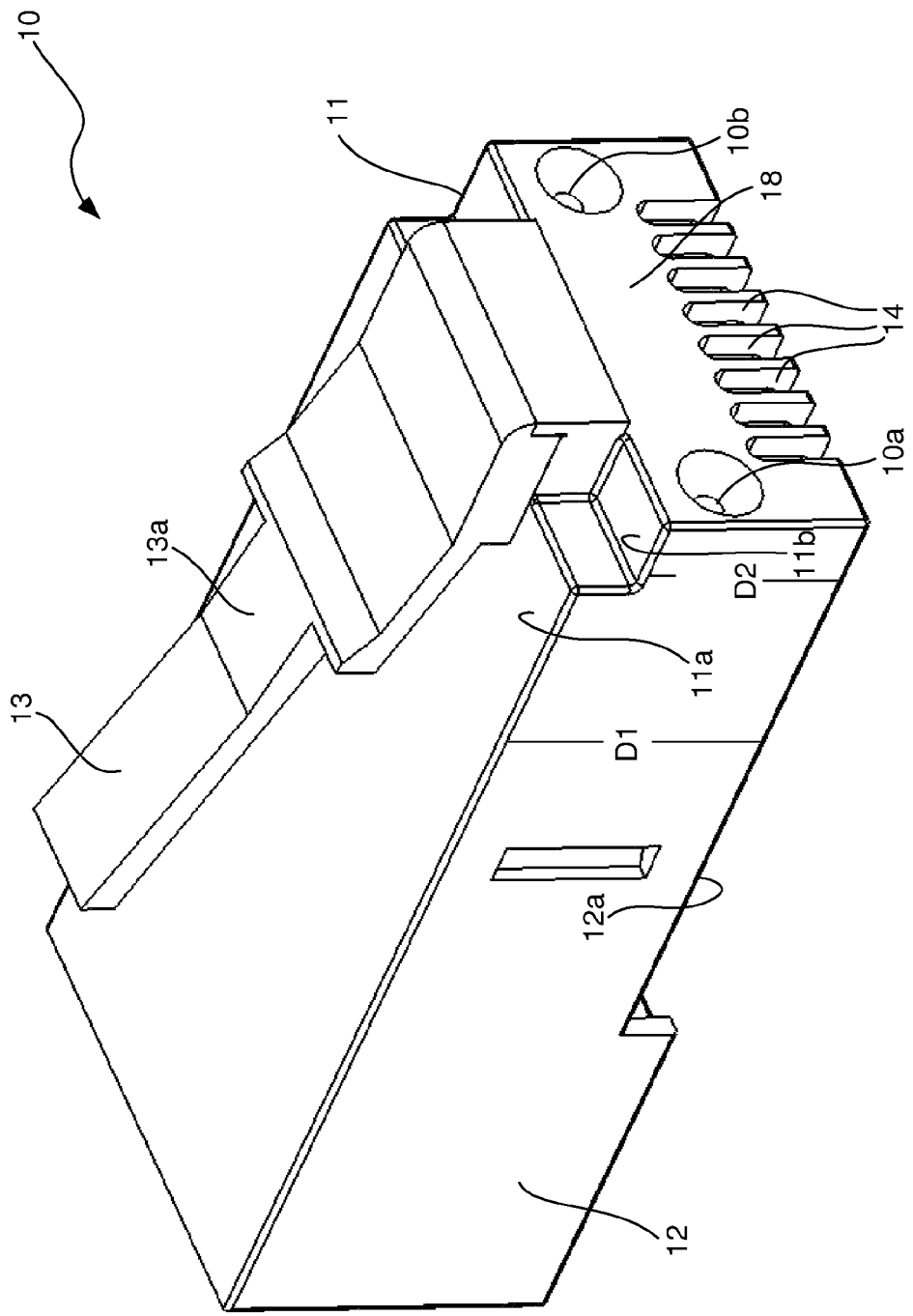
FIGS. 2A-2C illustrates, respectively, perspective top right front, top left front and bottom right front views of the plug of the modular connector assembly in accordance with an illustrative embodiment.
Figure 2B:
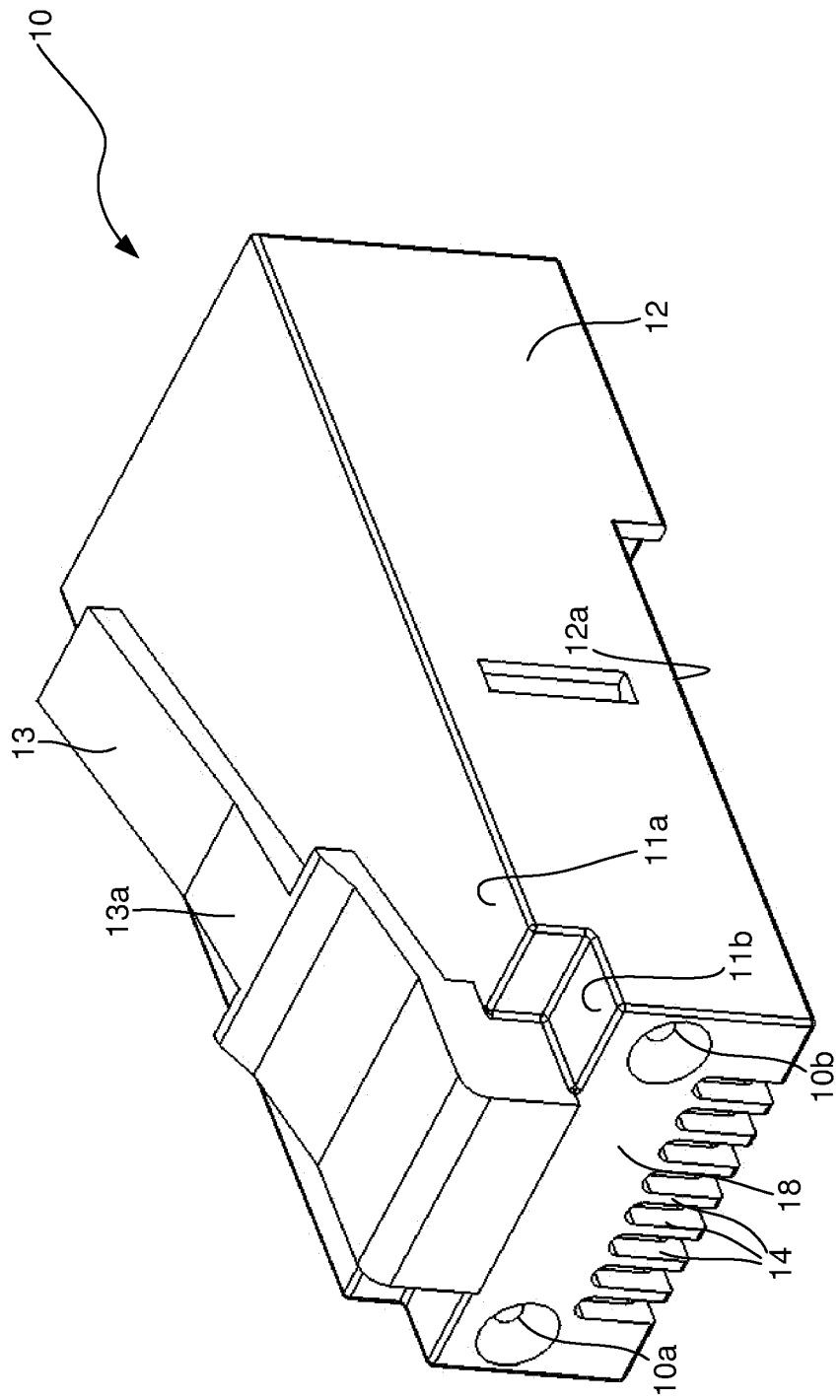
Figure 2C:
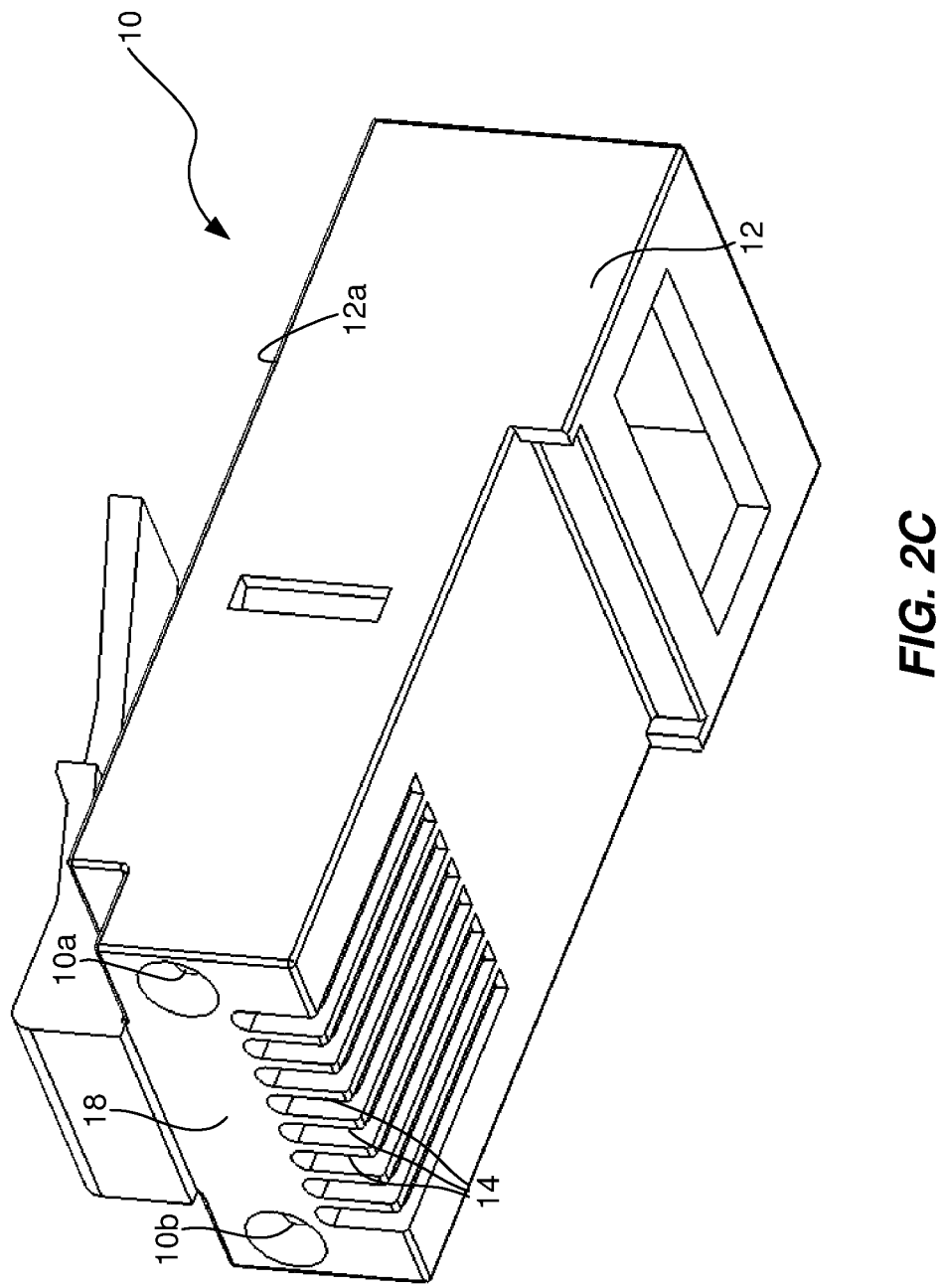

FIGS. 2A-2C illustrate, respectively, perspective top right front, top left front and bottom right front views of the plug 10 of the modular connector assembly in accordance with an illustrative embodiment. The plug 10 is similar in many respects to the typical 8P8C plug 1 shown in FIG. 1 used for Ethernet communications in that the plug 1 includes electrical wiring that complies with one of the RJ-45 wiring standards, i.e., either the T-568A or T-568B wiring standard. The plug 10 has a plug housing 12, a latch mechanism 13 formed on a top portion of the plug housing 12, an optical interface comprising openings 11a and 11b formed in a front portion of the plug housing 12, and a plurality of insulation displacement contacts 14 disposed on a bottom portion of the plug 10. The latch mechanism 13 has a locking feature 13a thereon that engages a locking feature of the jack when the plug 10 is mated with a jack, as will be described below in more detail with reference to FIGS. 8-11B.

As with a typical 8P8C modular connector assembly plug of the type shown in FIG. 1, the insulation displacement contacts 14 pierce the insulating jackets of twisted copper pair wires of a cable (not shown for purposes of clarity) when the plug 10 is installed on the end of the cable. The cable that is used with the plug 10 will typically be a Category 5 (CAT 5) or a Category 6 (CAT 6) cable as defined by the Electronic Industries Association and Telecommunications Industry Association (EIA/TIA), an optical fiber cable, or a hybrid cable. The CAT 5 and CAT 6 cables are electrical Ethernet cables. There are a variety of optical fiber cables used in the industry today, but the optical fiber cable that may be terminated with the plug 10 will typically be a rounded cable having a transmit optical fiber, a receive optical fiber a strength membrane, and protective jacket. It should be noted, however, that the invention is not limited with respect to the type of cable that is used with the plug 10.

In accordance with an embodiment, a hybrid cable that may be terminated by the plug 10 is a cable that includes electrical wires similar or identical to those contained in, for example, a CAT 5, CAT 5e, CAT 6a, or CAT 7 cable, and that also includes a transmit optical fiber and a receive optical fiber. Such a hybrid cable provides the option of communicating with either electrical Ethernet data signals or optical data signals. The hybrid cable typically comprises eight insulated copper wires, at least one transmit optical fiber, at least one receive optical fiber, and a cable jacket. If the cable is one of the aforementioned known cables, such as a CAT 5, CAT 5e, CAT 6a, or CAT 7 cable, the transmit and receive optical fibers may be embedded within the main cable jacket or they may be external to the main cable jacket and embedded in one or more optical fiber cable jackets. In the latter case, the two cable jackets may be attached to one another by some suitable attachment mechanism. At the end of the cable that attaches to the plug 10, the loose ends of the insulated copper wires are inserted into a wire and optical fiber (WOF) guide device (not shown for purposes of clarity) of the plug 10 in accordance with the RJ-45 wiring standard, as will be described below in more detail with reference to FIG. 12. The loose ends of the optical fibers can be stripped of their protection jackets and buffers and polished, as is commonly performed for fiber termination. The polished ends would then be inserted into respective ferrules (not shown for purposes of clarity) that are then guided through the aforementioned WOF guide device such that the ferrules are disposed within the respective openings 10a and 10b that provide the optical interface of the plug 10, as will be described below with reference to FIG. 12.

The openings 10a and 10b are disposed adjacent the right and left sides of the plug 10 in a proximal end face 18 of the plug 10. As will be described below in more detail below with reference to FIGS. 9-11B, ferrule-type elements (not shown for purposes of clarity) of optical-to-electrical (OE) and electrical-to-optical (EO) conversion modules (not shown for purposes of clarity) are partially received in the openings 10a and 10b, respectively. Inside of the respective openings 10a and 10b, the ends of the ferrule-type devices abut respective optics systems (not shown for purposes of clarity) of the plug 10, which, in turn, are optically coupled with the respective ends of a receive optical fiber and a transmit optical fiber, as will be described below in more detail with reference to FIGS. 11B and 12. This optical arrangement provides an optical coupling interface for optically coupling light between the OE and EO conversion modules and the receive and transmit optical fibers, respectively.

The plug housing 12 has a tiered surface 11 formed in the front portion of the plug housing 12 adjacent the proximal end face 18. The tiered surface comprises an upper tier surface 11a and a lower tier surface 11b such that a first distance, D1, between a lower surface 12a of the plug housing 12 and the upper tier surface 11a is greater than a second distance, D2, between the lower surface 12a of the plug housing 12 and the lower tier surface 11b. This difference between the first and second distances D1 and D2 operates in conjunction with the locking feature 13a formed on the latch mechanism 13 and in conjunction with complimentary features formed in the jack (not shown for purposes of clarity) to allow the plug 10 to be interlocked with the jack in either a first or a second interlocking position, as will be described below in detail with reference to FIG. 9-11B. Although the tiered surface 12 is not required, it provides one of many possible solutions for providing the plug 10 with both electrical and optical capabilities while also enhancing the versatility of the plug 10. In addition, providing these two different interlocking positions is one way in which the system in which the modular connector assembly is used to automatically differentiate between when it is operating in the electrical Ethernet mode and when it is operating in the optical mode. In addition, because the jack has features that are complimentary to the tiered surface 11, existing 8P8C plugs of the type shown in FIG. 1 that are configured to comply with the RJ-45 wiring standard may be interlocked inside of the jack in the normal manner. These features are described in more detail below with reference to FIGS. 7-9.

Figure 3:
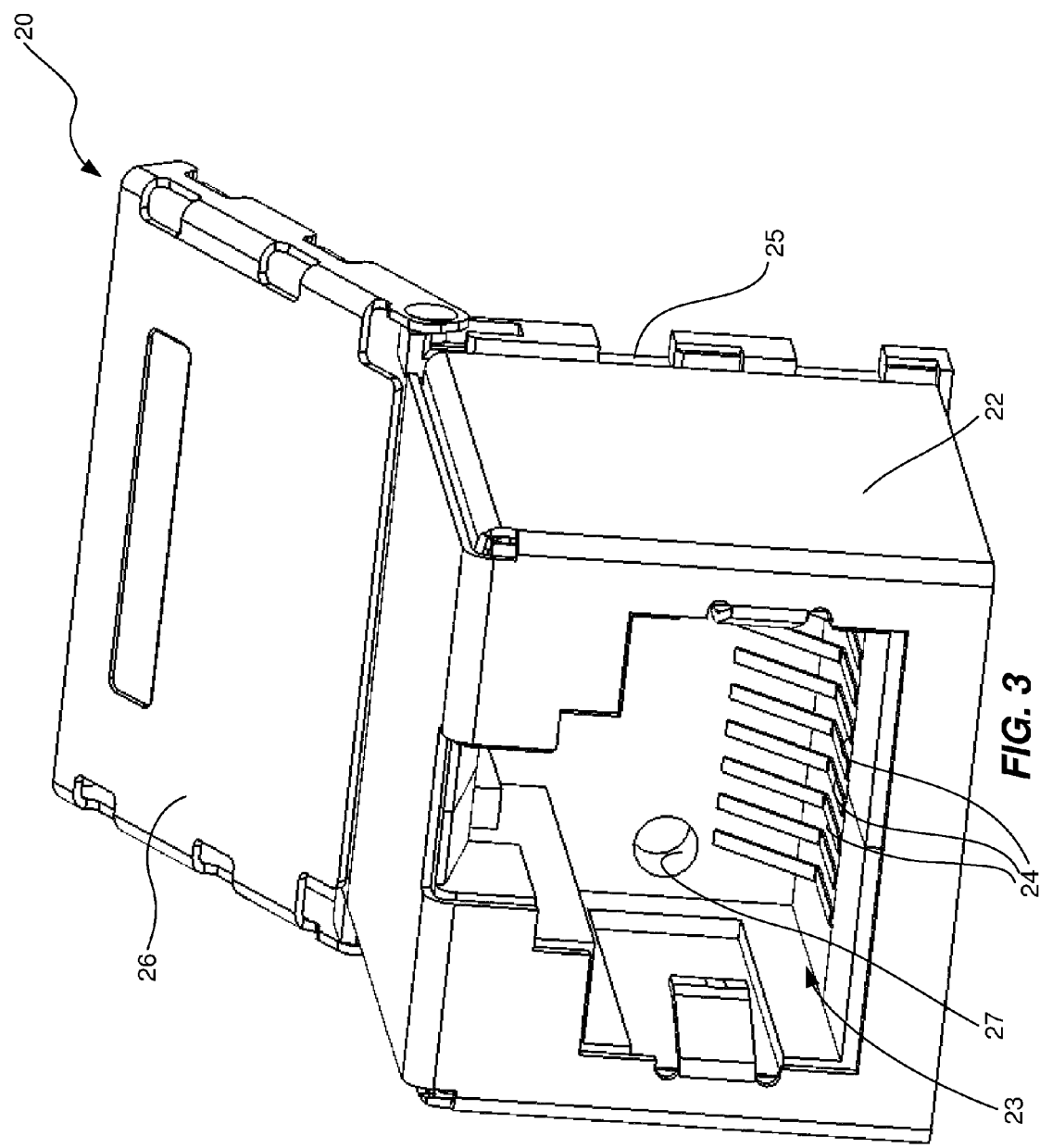
FIG. 3 illustrates a front perspective view of the jack of the modular connector assembly that mates with the plug shown in FIGS. 2A-2C in accordance with an illustrative embodiment.

FIG. 3 illustrates a front perspective view of the jack 20 of the modular connector assembly that mates with the plug 10 shown in FIGS. 2A-2C in accordance with an illustrative embodiment. The jack 20 has a jack housing 22 that has a front opening 23 formed therein. The front opening 23 is configured to receive an 8P8C plug such as the plug 10 shown in FIGS. 2A-2C or a convention 8P8C plug of the type shown in FIG. 1. A plurality (e.g., eight) of electrical contacts 24 are disposed inside of the opening 23 for making contact with respective insulation displacement contacts 4 or 14 shown in FIG. 1 or in FIGS. 2A-2C, respectively, when the plug 1 or 10 is locked inside of the jack 20. The electrical contacts 24 are electrically coupled to other electrical circuitry (not shown for purposes of clarity) external to the jack 20. The jack housing 22 has a back cover 25 secured to a back portion of the jack housing 22. The back cover 25 has a door 26 that is in a hinging relationship with the cover 25. The cover 25 has openings 27 formed therein through which the aforementioned ferrule-type elements (not shown for purposes of clarity) of the OE and EO conversion modules (not shown for purposes of clarity) extend when the OE and EO conversion modules are installed in the jack housing 22, as will be described below in more detail with reference to FIGS. 4-6. Alternatively, in an embodiment in which the OE and EO conversion module or modules are installed on an external circuit board (not shown for purposes of clarity) on which the jack housing 22 resides, respective ends of respective optical fibers extend into the respective openings 27 to optically couple the external EO and OE conversion module(s) to the jack 20, as will be described below in more detail with reference to FIG. 14.

Figure 4:
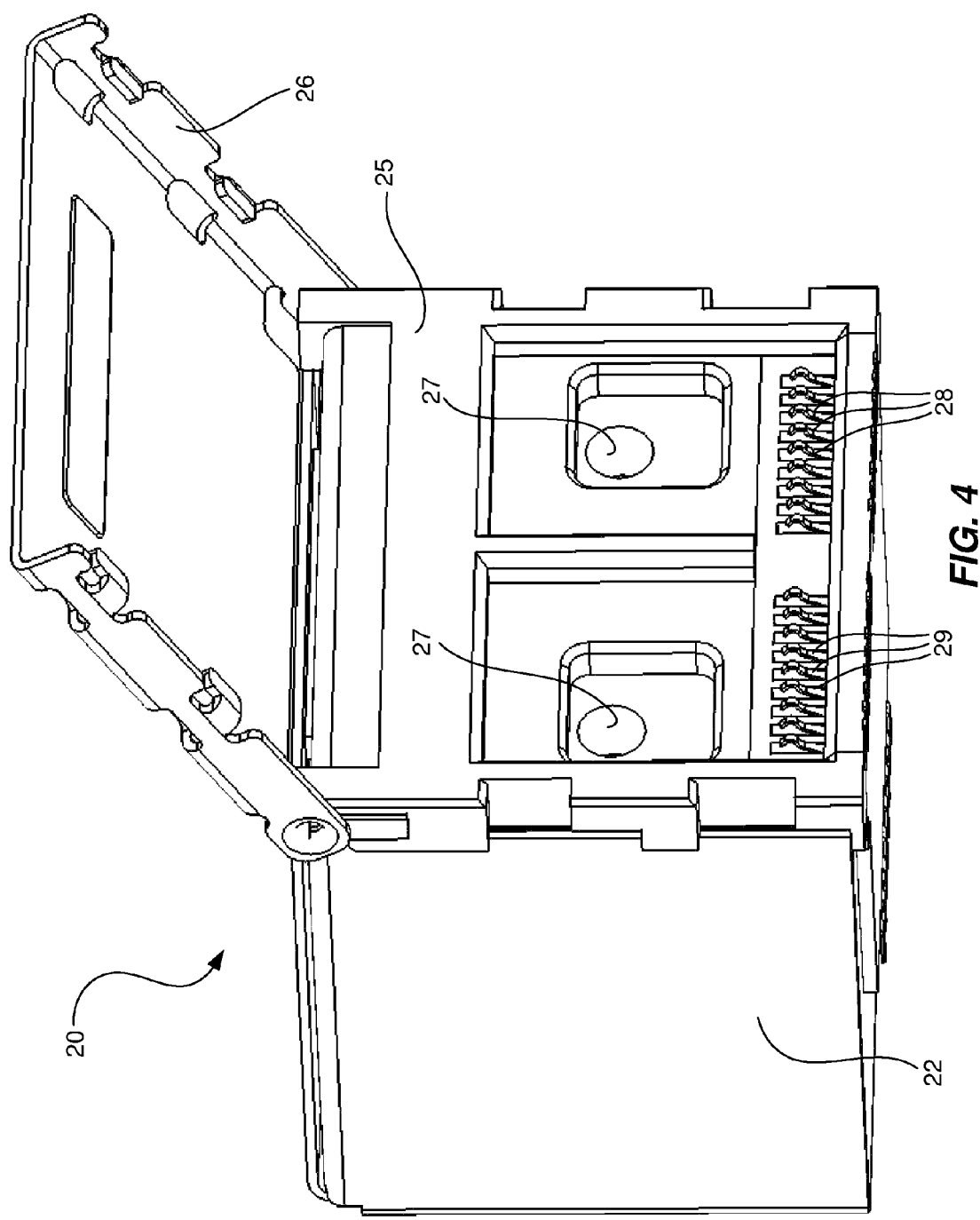
FIG. 4 illustrates a back perspective view of the jack shown in FIG. 3 having the cover attached thereto with the door in the opened position to reveal locations in the cover at which the OE and EO conversion modules will be installed.
Figure 5:
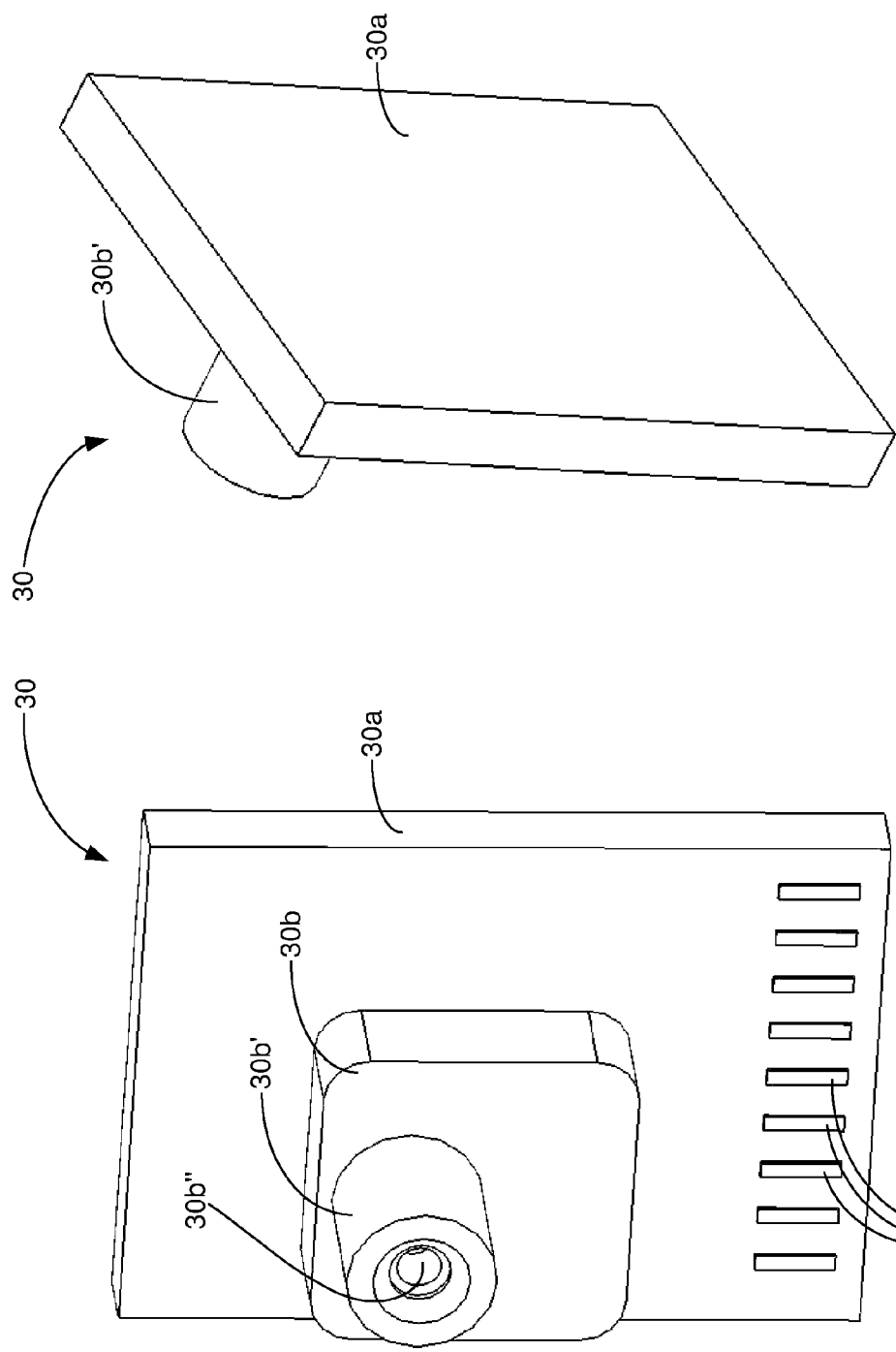
FIGS. 5A and 5B illustrate front and back perspective views, respectively, of the EO and OE conversion modules that attach to the cover shown in FIG. 4.

FIG. 4 illustrates a back perspective view of the jack 20 shown in FIG. 3 having the cover 25 attached thereto with the door 26 in the opened position to reveal locations in the cover 25 at which the OE and EO conversion modules (not shown for purposes of clarity) will be installed. FIGS. 5A and 5B illustrate front and back perspective views, respectively, of the EO or the OE conversion module 30. In accordance with this illustrative embodiment, the OE and EO conversion modules 30 are formed on separate substrates. It should be noted, however, that the OE and the EO conversion modules 30 could be integrated on the same substrate. For ease of illustration and in the interest of brevity, the latter approach is not shown in the drawings because its appearance is very similar to that of placing the EO and OE conversion modules 30 shown in FIGS. 5A and 5B side by side.

The EO conversion module 30 includes a substrate 30a and an EO module housing 30b. The EO module housing 30b includes the aforementioned ferrule-type element, which is identified in FIGS. 5A and 5B by reference numeral 30b'. The ferrule-type element 30b' has an optics system (e.g., a lens) 30b" disposed therein. Inside of the EO module housing 30b, an EO conversion device, which is typically a laser diode (not shown for purposes of clarity), and a corresponding laser diode driver integrated circuit (IC) (not shown for purposes of clarity) are mounted on and electrically coupled to the substrate 30a. Electrical contacts 30c disposed on the PCB 30a come into contact with respective electrical contacts 28 (FIG. 4) disposed on the back cover 25 when the EO conversion module 30 is installed in the back cover 25 of the jack 20. The electrical contacts 28 are electrically coupled by other electrical conductors (not shown for purposes of clarity) to electrical circuitry that is external to the jack 20, as will be described below in more detail with reference to FIG. 13. Alternatively, the EO and OE conversion modules, or a combined EO/OE conversion module could be mounted on an external system board on which the jack housing 22 resides, in which case a ferule-type element similar or identical to the ferrule-type elements 30b' has a fiber end attached to it such that a fiber pigtail disposed on the opposite end of the fiber extends from the EO/OE conversion module into hole 27, as will be described below in more detail with reference to FIG. 14. In such an alternative implementation, the electrical contacts 28 and 29 disposed on the jack housing are unnecessary.

The OE conversion module (not shown for purposes of clarity) is identical in construction to the EO conversion module 30 shown in FIGS. 5A and 5B with the exception that instead of a laser diode and driver IC, the OE conversion module has an OE conversion device, which is typically a P-I-N photodiode (not shown for purposes of clarity), and a receiver IC (not shown for purposes of clarity). The visible components of the OE conversion module will be described with reference to FIGS. 5A and 5B. Although they are not visible in FIGS. 5A and 5B, the P-I-N photodiode and the receiver IC are mounted on and electrically coupled to the substrate 30a.

When an optical cable or hybrid cable is terminated by the plug 1 shown in FIGS. 2A-2C, light generated by the laser diode is coupled via the optics system 30b" into an end of a transmit optical fiber (not shown for purposes of clarity) of the cable. Conversely, light passing out of the end of a receive optical fiber of the cable is coupled via the optics system 30b" onto the P-I-N photodiode, which converts the light into electrical signals. The electrical signals are then electrically coupled via the electrical contacts 29 (FIG. 4) disposed on the back cover 25 to electrical circuitry that is external to the jack 20, as will be described below in more detail with reference to FIG. 13. As indicated above, instead of the OE and the EO conversion modules residing on two separate substrates as shown in FIGS. 5A and 5B, the laser diode, the P-I-N photodiode, the laser diode driver IC, and the receiver IC may be integrated on a single substrate. Alternatively, the laser driver and the receiver may be integrated into the same IC, which would then be integrated onto a single substrate on which the ferule-type elements 30b' and optics systems 30b" are also integrated on the substrate. In the latter case, the optics systems 30b" may be housed in the same module housing 30b or in separate module housings and the ferule-type elements 30b' may be part of the same module housing or parts of separate module housings.

Figure 6:
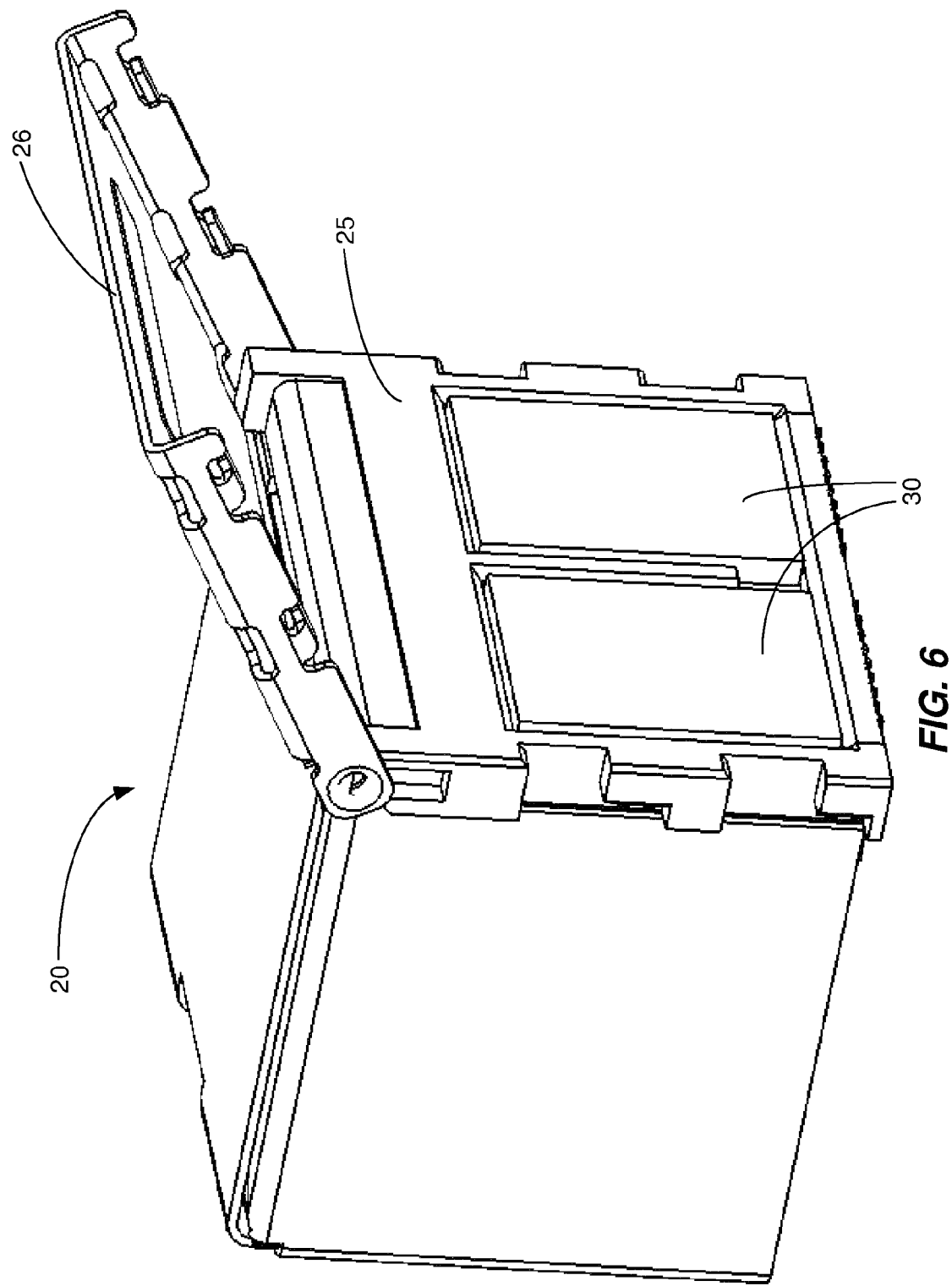
FIG. 6 illustrates a back perspective view of the jack shown in FIG. 3 after the OE and EO conversion modules shown in FIGS. 5A and 5B have been installed in the back of the jack, but prior to the door being closed.
Figure 7:
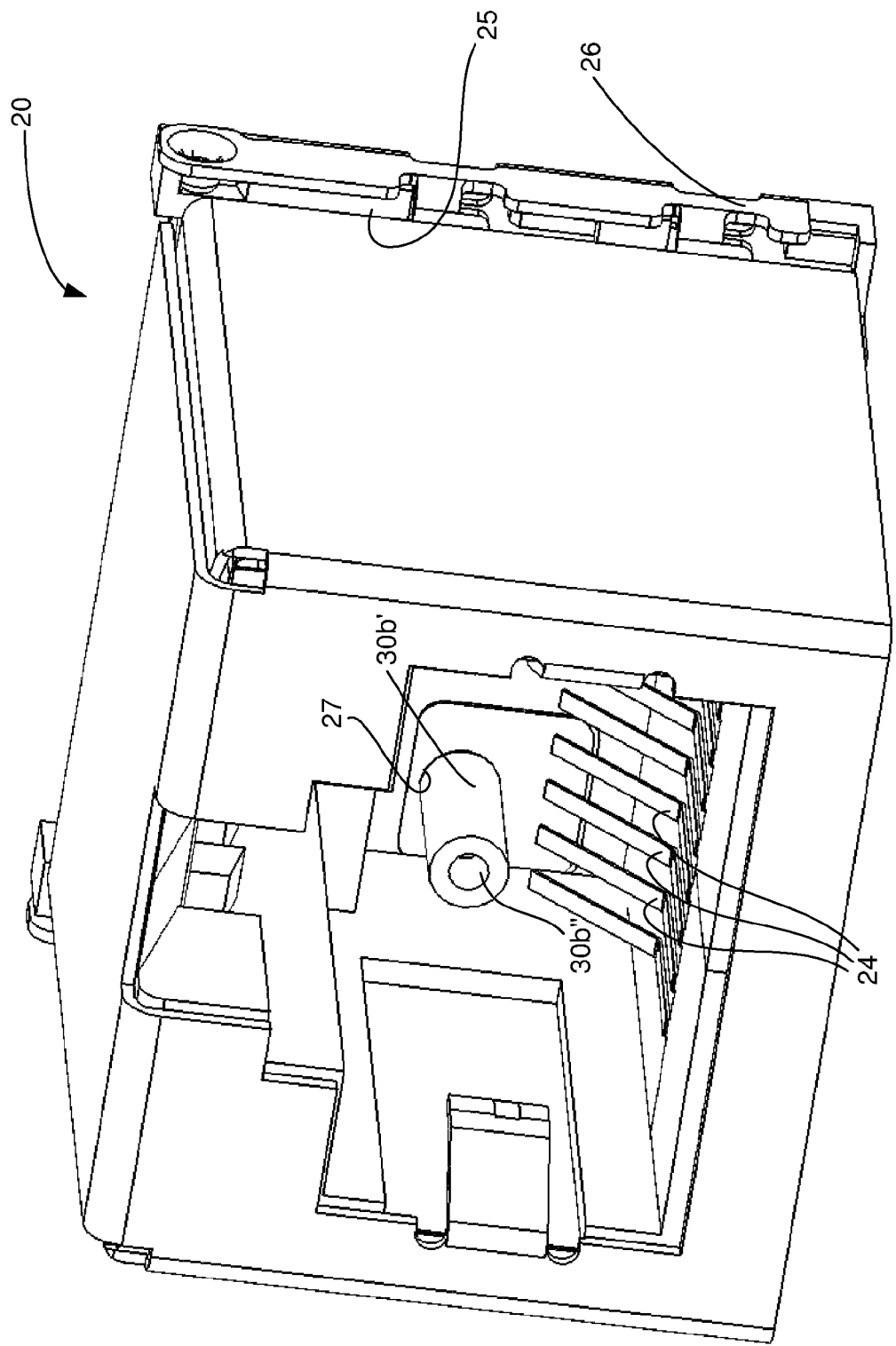
FIG. 7 illustrates a front perspective view of the jack after the OE and EO conversion modules have been installed in the back of the jack and the door has been closed.

FIG. 6 illustrates a back perspective view of the jack 20 shown in FIGS. 3 and 4 after the OE and EO conversion modules 30 have been installed in the back of the jack 20, but prior to the door 26 being closed. FIG. 7 illustrates a front perspective view of the jack 20 shown in FIG. 6 after the OE and EO conversion modules 30 have been installed in the back of the jack 20 and the door 26 has been closed. The end of one of the ferrule-type elements 30b' can be seen positioned within one of the openings 27 formed in the back cover 25. The locations in the cover 25 at which the EO and OE conversion modules 30 are secured to the cover 25 are shown in FIG. 4 as cutaway regions where respective rectangular portions of the cover 25 have been removed to accommodate the shapes of the module housing 30b and the substrate 30a. The invention is not limited with respect to the manner in which the EO and OE conversion modules 30 or the cover 25 are shaped or with respect to the manner in which the modules 30 attach to the cover 25. For example, the entire module housing 30b may extend through the cover 25 into the front opening 23, as will be described below with reference to FIGS. 10-11B, or, alternatively, only the ferule-type elements 30b' may extend through the cover 25 into the front opening 23, as shown FIG. 7.

Figure 8:
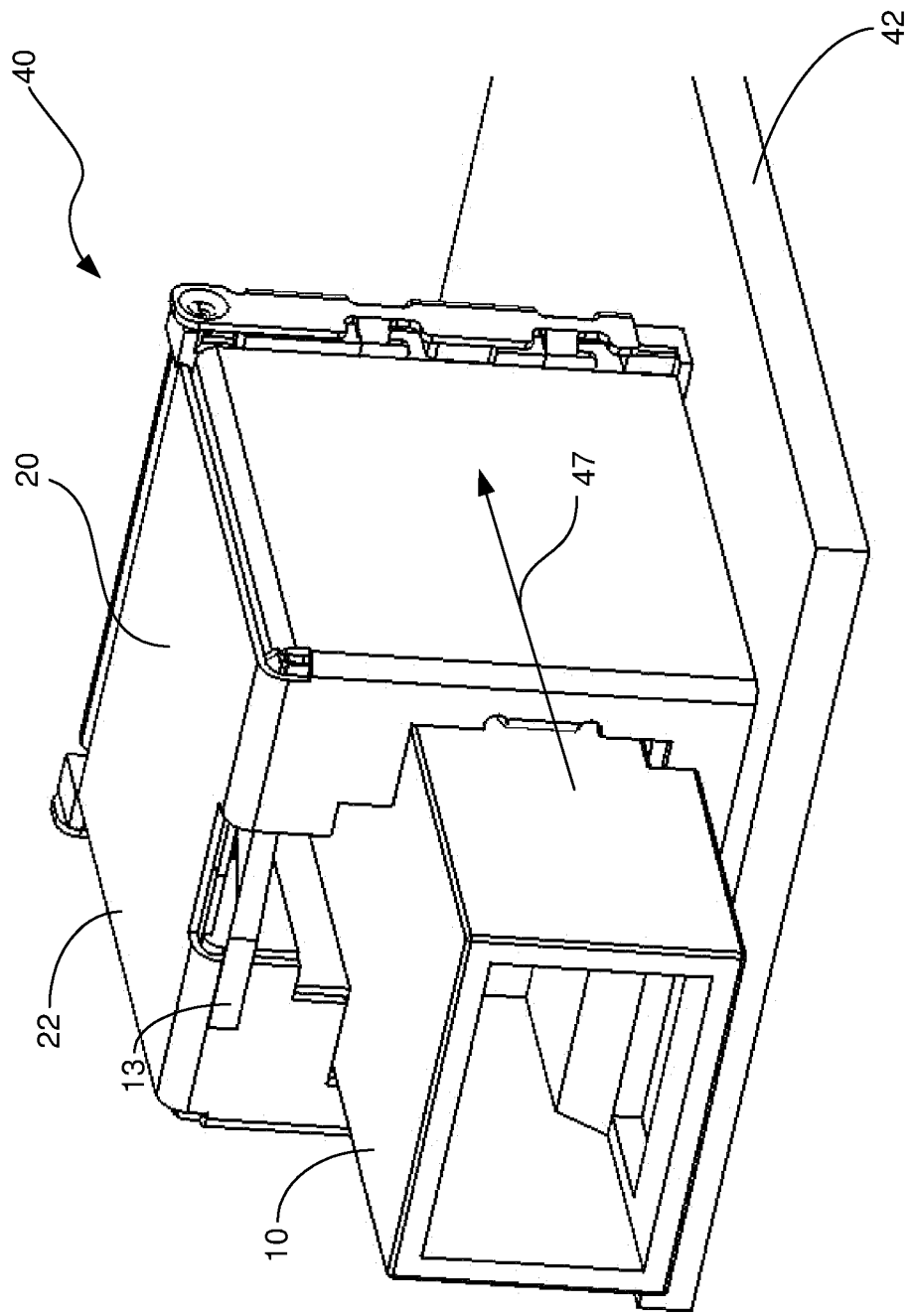
FIG. 8 illustrates a perspective view of the modular connector assembly of the invention comprising the plug shown in FIGS. 2A-2C and the jack shown in FIGS. 3, 4, 6, and 7.
Figure 9:
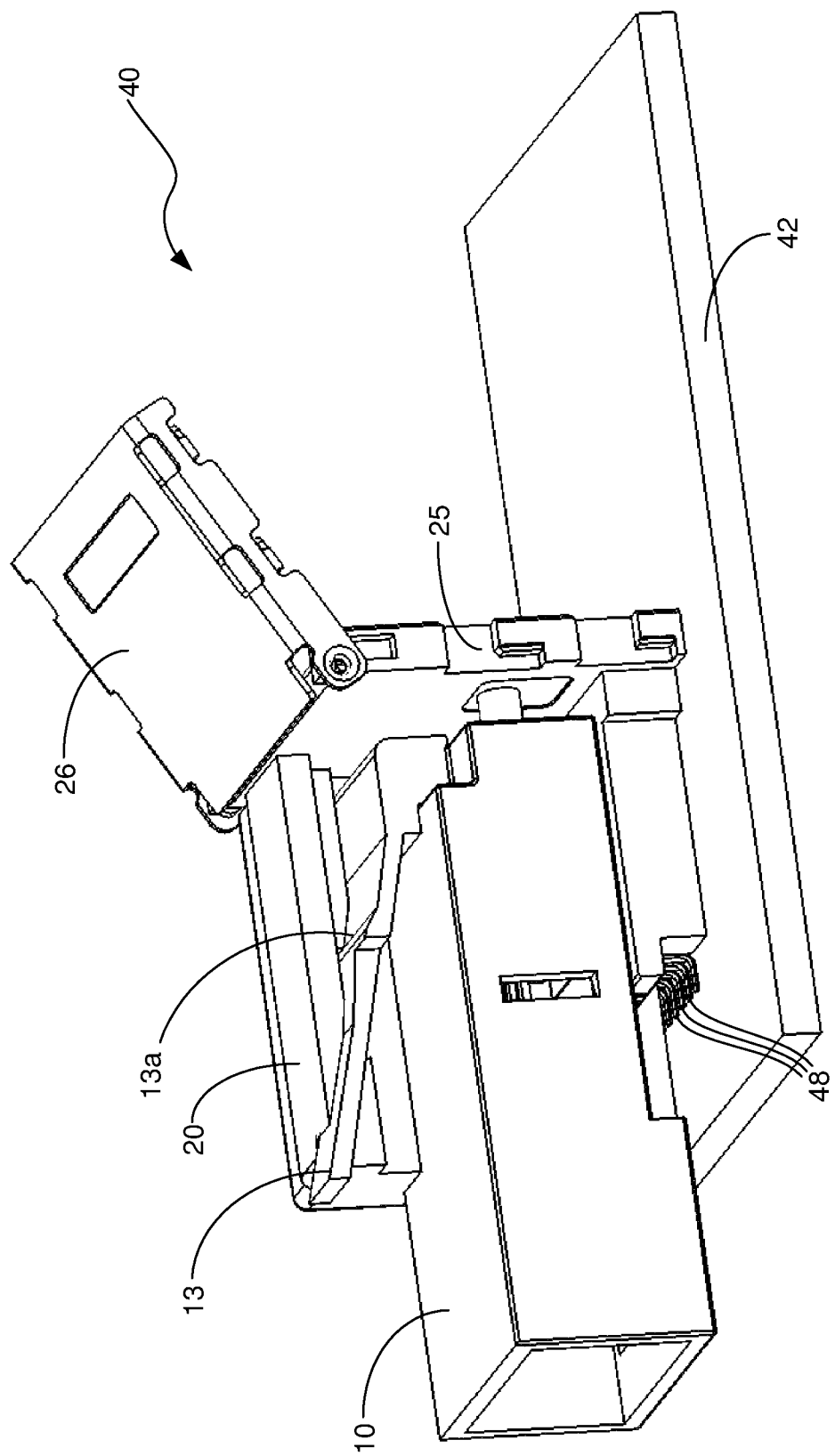
FIG. 9 illustrates a cutaway view of the assembly shown in FIG. 8 with a portion of the jack removed to show the manner in which the plug shown in FIGS. 2A-2C is removably secured to the jack.
Figure 10:
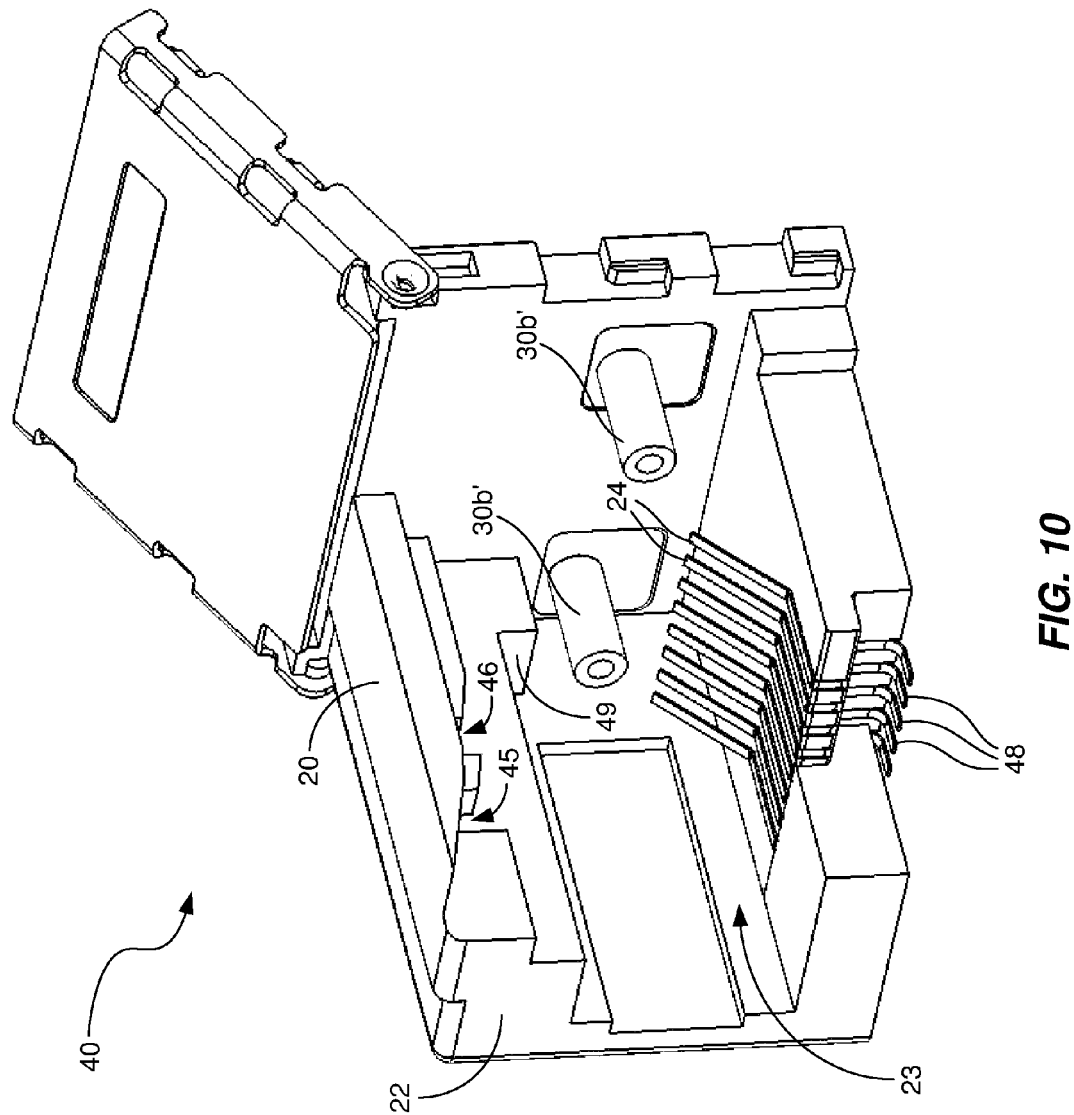
FIG. 10 illustrates a cutaway view of the jack shown in FIG. 3 with the plug shown in FIGS. 2A-2C removed to allow the locking features of the jack to be seen.
Figure 11A:
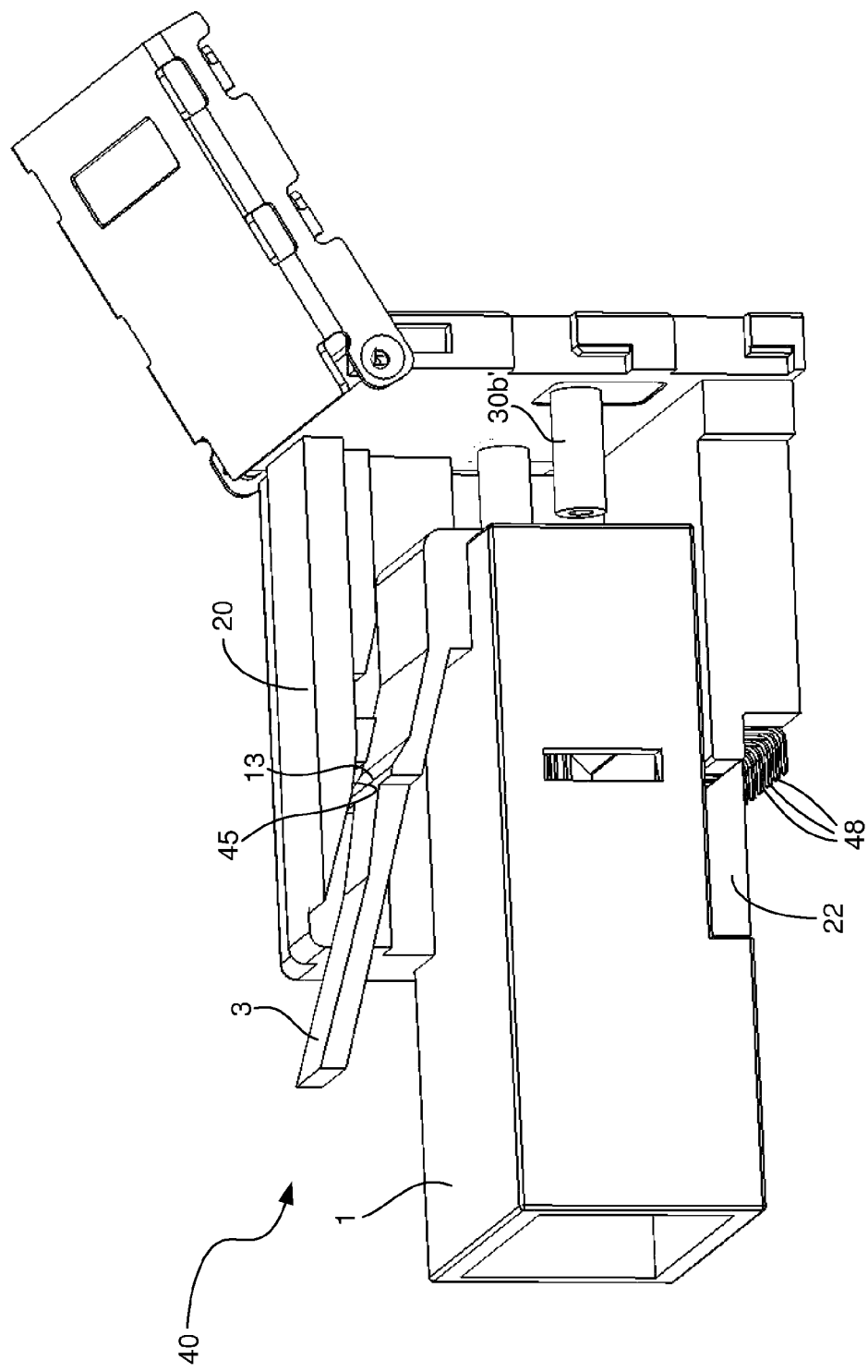
FIG. 11A illustrates a cutaway view of the modular connector assembly shown in FIG. 8 with the plug shown in FIG. 1 interlocked with the jack in a first interlocking position for electrical Ethernet communications.

FIG. 8 illustrates a perspective view of the modular connector assembly 40 of the invention comprising the plug 10 shown in FIGS. 2A-2C and the jack 20 shown in FIGS. 3, 4, 6, and 7 mounted on a system printed circuit board (PCB) 42. In FIG. 8, the plug 10 and the jack 20 are shown interlocked. FIG. 9 illustrates a cutaway view of the assembly 40 shown in FIG. 8 with a portion of the jack 20 removed to show the manner in which the plug 10 is removably secured to the jack 20. FIG. 10 illustrates a cutaway view of the jack 20 with the plug 10 removed to reveal locking features 45 and 46 of the jack 20. One of the locking features 45 and 46 of the jack 20 engages the locking feature 13a of the latch mechanism 13 when the plug 10 is inserted into the opening 23 formed in the front of the jack 20. FIG. 11A illustrates a cutaway view of a modular connector assembly comprising the jack 20 shown in FIG. 3 and the standard electrical-only RJ-45 plug 1 shown in FIG. 1 interlocked with the jack 20 in the aforementioned first interlocking position for electrical Ethernet communications. FIG. 11B illustrates a cutaway view of the modular connector assembly 40 shown in FIG. 8 with the plug 10 shown in FIGS. 2A-2C interlocked with the jack 20 in the aforementioned second interlocking position for either optical communications or Ethernet electrical communications as dictated by the Ethernet Controller and Physical Layer IC shown in FIGS. 13 and 14, as will be described below in detail. The manner in which the plug 10 and the jack 20 are interlocked with each other will now be described with reference to FIGS. 10-11B.

As can be seen in FIG. 10, there are first and second locking features 45 and 46 inside of the opening 23 formed in the front portion of the jack 20. The first and second locking features 45 and 46 are first and second openings, respectively, formed in an upper portion of the jack 20. The first and second locking features 45 and 46 have shapes that are complementary to the shape of the locking feature 13a of the latch mechanism 13. When the plug 10 shown in FIGS. 2A-2C is inserted into the opening 23 formed in the front of the jack 20, one of the locking features 45 and 46 of the jack 20 engages the locking feature 13a of the latch mechanism 13, depending on how far the plug 10 is inserted into the jack 20 in the direction represented by arrow 47 in FIG. 8. Depressing the latch mechanism 13 in the downward direction toward the system PCB 42 unlocks the latch mechanism 13 to allow it to be removed from the jack 20. If the plug 10 is inserted into the jack 20 far enough for the locking feature 13a on the latch mechanism 13 of the plug 10 to be received in locking feature 45, the plug 10 will be interlocked with the jack 20 in the aforementioned first interlocking position. If the plug 10 is inserted into the jack 20 just far enough for the locking feature 13a of the latch mechanism 13 of the plug 10 to be received in locking feature 46, the plug 10 will be interlocked with the jack 20 in the aforementioned second interlocking position. FIGS. 11A and 11B show the standard electrical-only RJ-45 plug 1 of FIG. 1 and the plug 10 of FIGS. 2A-2C, respectively, in the first and second interlocking positions, respectively, inside of the jack 20.

Electrical contacts 48 on the underside of the jack 20 are in contact with electrical contacts (not shown for purposes of clarity) on the system PCB 42. The electrical contacts 48 are distal ends of the electrical contacts 24 disposed in the opening 23 of the jack 20 shown in FIGS. 3 and 7. In the first interlocking position shown in FIG. 11A, the insulation displacement contacts 4 of the standard electrical-only RJ-45 plug 1 shown in FIG. 1 are electrically coupled via the electrical contacts 24 (FIG. 7) of the jack 20 to the electrical contacts (not shown for purposes of clarity) located on the system PCB 42 beneath the jack 20. This electrical coupling configuration that exists in the first interlocking position enables electrical Ethernet communications to be performed. In the second interlocking position shown in FIG. 11B, optical interfaces are created between the optics systems 30b" of the ferrule-type elements 30b' (FIGS. 5A and 5B) of the OE and EO conversion modules 30 and the ends of the receive and transmit optical fibers, respectively, (not shown for purposes of clarity). As mentioned above, a WOF guide device 60 (FIG. 11B) secured within the plug housing 12 functions as a mechanical guide for mechanically guiding electrical wires of a hybrid cable (not shown for purposes of clarity) and the ferrules on the ends of the optical fibers of the hybrid cable (not shown for purposes of clarity) within the openings 10a and 10b formed in the plug housing 12, as will be described below in more detail with reference to FIG. 12. In the second interlocking position shown in FIG. 11B, the tiered surface 11 of the plug 10 (FIGS. 2A-2C) abuts a complementarily-shaped surface 49 (FIG. 10) formed in an upper portion of the jack 20. The optical coupling configuration that exists in the second interlocking position enables optical communications to be performed in addition to, or in lieu of, the electrical communication provided through contacts 48 to the system board 42. As will be described below in more detail with reference to FIG. 13, other components that communicate with the OE and EO conversion modules 30 and/or with the RJ-45 wiring of the jack 20 are mounted on the system PCB 42 and electrically connected via conductors of the system PCB 42 to the electrical contacts 48 of the jack 20.

Figure 12:
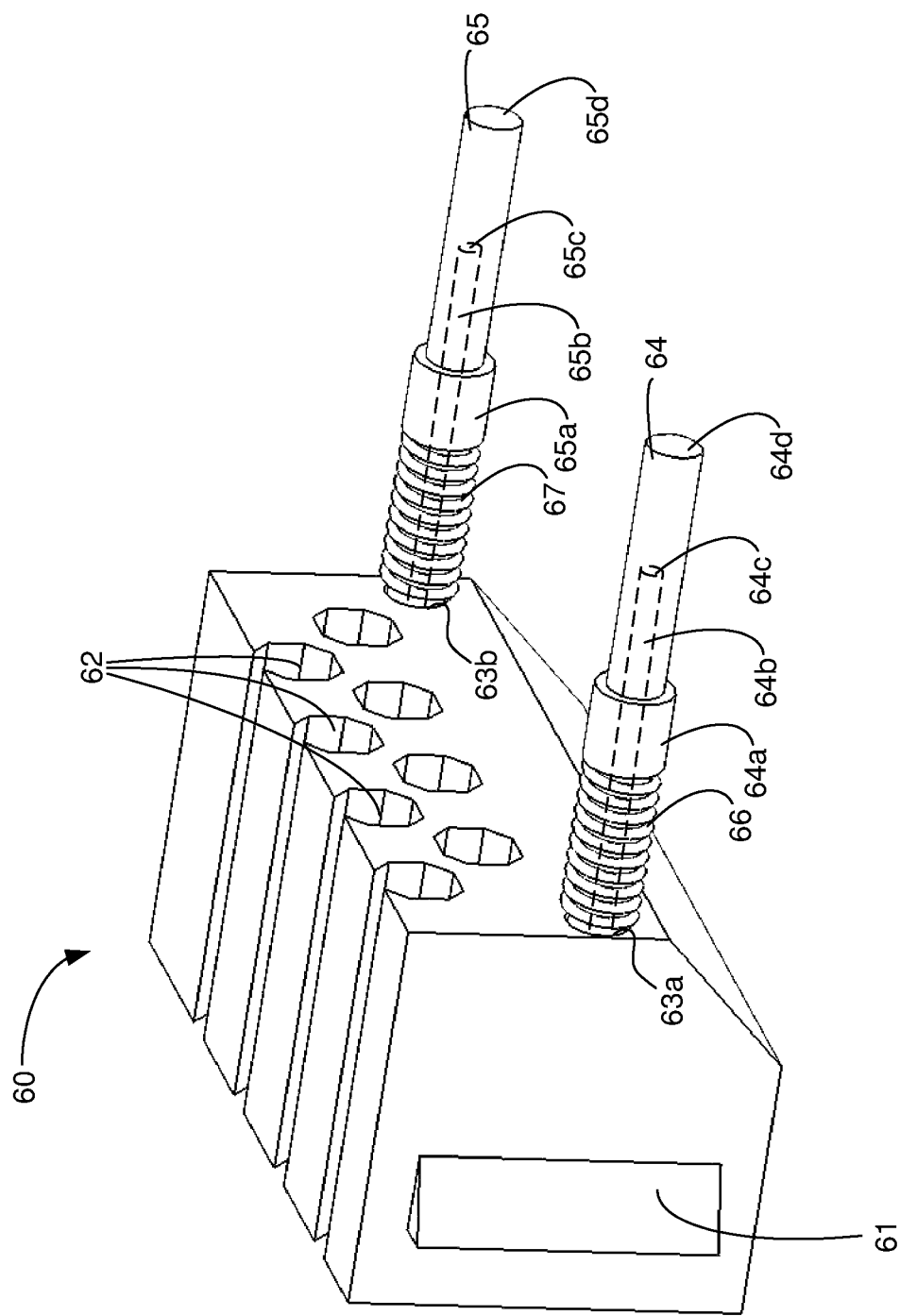
FIG. 12 illustrates a cross-sectional view of the wire guide device of the plug shown in FIGS. 11A and 11B.

FIG. 12 illustrates a perspective view of the WOF guide device 60 shown in FIG. 11B. When the WOF guide device 60 is installed inside of the plug housing 12, locking features 61 on the sides of the guide device 60 are received in openings (not shown for purposes of clarity) formed in the plug housing 12 to interlock the WOF guide device 60 with the plug housing 12. The WOF guide device 60 has openings 63a and 63b formed therein in which ferrules 64 and 65 are disposed, respectively. Each of the ferrules 64 and 65 has a compression spring 66 and 67, respectively, disposed thereon that has a diameter that is slightly larger than the diameter of the respective openings 63a and 63b. The ferrules 64 and 65 have flange portions 64a and 65a, respectively, each having an outer diameter that is larger than an outer diameter of the ferrules 64 and 65, respectively, and that is about the same size as the outer diameter of the compression springs 66 and 67, respectively. The ferrules 64 and 65 have inner diameters 64b and 65b, respectively, that are about the same size as the outer diameters of receive and transmit optical fiber (not shown for purposes of clarity). When the receive and transmit optical fibers are guided inside of the respective ferrules 64 and 65, the ends of the respective fibers abut respective lenses 64c and 65c formed inside of the respective ferrules 64 and 65.

With reference to FIGS. 2A, 5A, 10, 11B, and 12, when the plug 10 is inserted into the opening 23 formed in the jack 20 and interlocked with the jack 20 in the aforementioned second interlocking position, respective ends 64d and 65d of the respective ferrules 64 and 65 are received inside of the respective ends of the ferrule-type elements 30b' of the respective OE and EO conversion modules 30 such that the respective ends 64d and 65d interface with the respective optics systems 30b" of the respective ferrule-type elements 30b'. As the plug 10 is inserted into the opening 23 formed in the jack 20 and the respective ends 64d and 65d of the ferrules 64 and 65 come into contact with the respective optics systems 30b", the force in the direction of insertion of the plug 10 causes the ferrules 64 and 65 to retract into the openings 63a and 63b, respectively, formed in the WOF guide device 60. Once the locking feature 13a of the latch mechanism 13 of the plug 10 interlocks with the locking feature 46 formed on the jack housing 22, retraction of the ferrules 64 and 65 ceases. The compression springs 66 and 67 exert forces that maintain the ends 64d and 65d in abutment with the respective optics systems 30b'. The resulting coupling of optical signals between the ends 64d and 65d of the respective ferrules 64 and 65 and the respective optics systems 30b" occurs with very little, if any, optical loss. The ends 64d and 65d are lenses with the focal points at the ends of the fibers.

Figure 13:
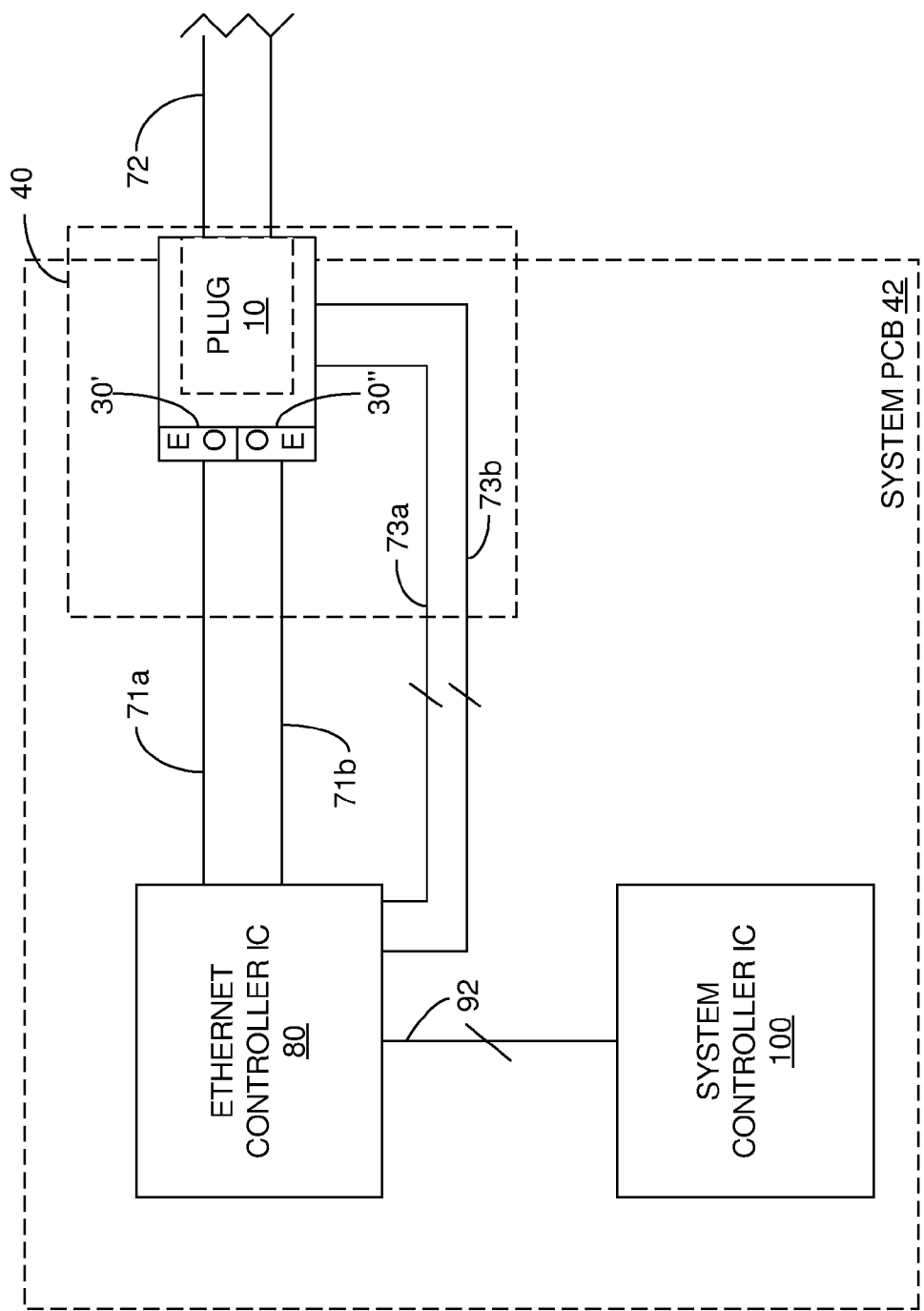
FIG. 13 illustrates a block diagram of the system PCB shown in FIGS. 8 and 9 having the modular connector assembly shown in FIG. 8 and additional components mounted thereon in accordance with one illustrative embodiment.

FIG. 13 illustrates a block diagram of the system PCB 42 shown in FIGS. 8 and 9 having the modular connector assembly 40 and additional components mounted thereon. In the illustrative embodiment described above with reference to FIGS. 2A-12, the OE and EO conversion modules 30, which are labeled with reference numerals 30' and 30" in FIG. 13, are integrated into the jack 20. When the OE and EO conversion modules 30' and 30" are installed in the jack 20 in the manner described above with reference to FIG. 6, the electrical contacts 30c (FIG. 5A) of the modules 30' and 30" are in contact with the respective electrical contacts 28 and 29 of the cover 25 (FIG. 4), which are, in turn, in contact with respective electrical connections (not shown for purposes of clarity) disposed on the system PCB 42 (FIGS. 8 and 9). With reference to FIG. 13, electrical traces 71a and 71b electrically couple the OE and EO conversion modules 30' and 30" to an Ethernet Controller and Physical Layer (ECPL) IC 80. Electrical trace group 73a and 73b carry electrical Ethernet signals to and from the electrical contacts 48 of the jack 20 to and from the ECPL IC 80. As will be described below in more detail, the EPCL IC 80 has the capability of performing auto-negotiation with a corresponding IC (not shown for purposes of clarity) located at the end of the link opposite the end of the link to which the modular connector assembly 40 is installed in order to choose whether to carry out electrical or optical communications.

When optical signals are to be transmitted from the system PCB 42 over the cable 72, which is either an optical cable or a hybrid cable, electrical signals are transmitted from the EPLC IC 80 over the electrically conductive traces 71a to the EO conversion module 30'. The EO conversion module 30' converts the electrical signals into optical signals and couples the optical signals into an end of a transmit optical fiber (not shown for purposes of clarity) of the cable 72. When optical signals received over a receive optical fiber (not shown for purposes of clarity) of the cable 72 are coupled from the end of the receive optical fiber into the OE conversion module 30", the OE conversion module 30" converts the optical signals into electrical signals and couples the electrical signals onto the electrically conductive traces 71b for transmission to the EPLC IC 80. The EPLC IC 80 communicates via electrically conductive traces 92 with the system controller IC 100.

When electrical Ethernet signals are to be transmitted from the system PCB 42 over the cable 72, which is either an Ethernet cable or a hybrid cable, electrical signals are transmitted from the EPLC IC 80 over the electrically conductive traces 73a to RJ-45 electrical circuitry (not shown for purposes of clarity) within the jack 20 and plug 10. The electrical signals are then electrically coupled from the RJ-45 electrical circuitry within the jack 20 and plug 10 onto one or more electrical wires of the cable 72. When electrical Ethernet signals are received over one or more electrical wires of the cable 72, the electrical signals are coupled via the RJ-45 electrical circuitry of the plug 10 and jack 20 from the ends of the electrical wires of the cable 72 onto the electrically conductive traces 73b, which carry the electrical signals to the EPLC IC 80.

Figure 14:
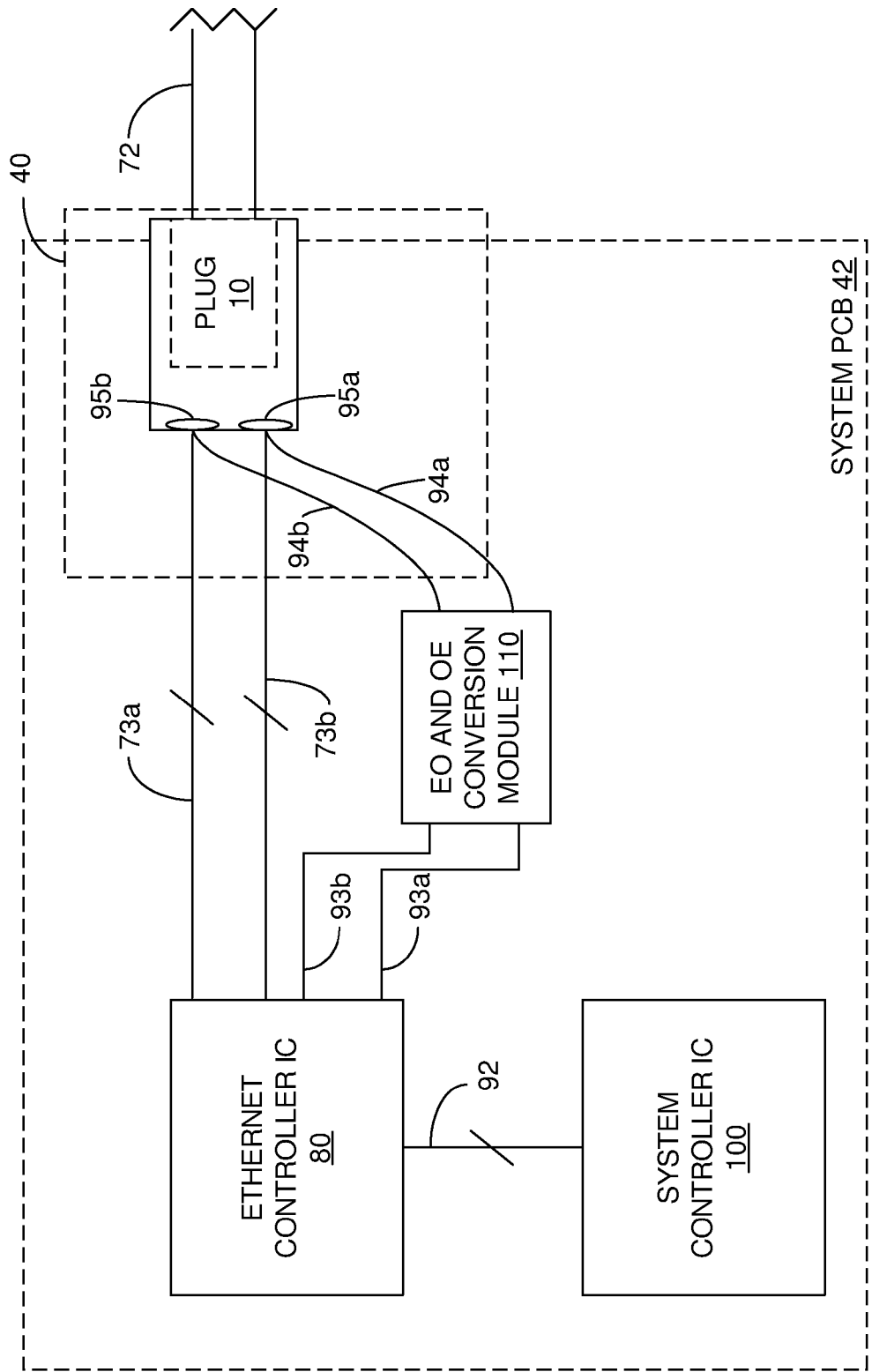
FIG. 14 illustrates a block diagram of the system PCB shown in FIGS. 8 and 9 having the modular connector assembly shown in FIG. 8 and additional components mounted thereon in accordance with another illustrative embodiment.

As an alternative to the illustrative embodiment described above with reference to FIG. 13, the OE/EO conversion modules may be external to the jack 20 and mounted on the system PCB 42, as will now be described with reference to FIG. 14. FIG. 14 illustrates a block diagram of the system PCB 42 having the modular connector assembly 40 shown in FIGS. 8 and 9 and additional components mounted thereon, including an EO and OE (EO/OE) conversion module 110. In accordance with this embodiment, the EO/OE conversion module 110 is external to the jack 20. The jack 20 may be identical to the jack shown in FIGS. 3, 4 and 6 except that the OE and EO conversion modules 30 shown in FIGS. 5A and 5B have been removed from the jack 20. Two optical fibers 94a and 94b optically couple the EO/OE conversion module 110 to the jack 20. The ends of the optical fibers 94a and 94b that are to be inserted into the jack 20 may have ferrules on them that are similar or identical to the ferrules 64 and 65 shown in FIG. 12 or to the ferrule-type elements 30b' shown in FIG. 10. These ends having the ferrules or ferrule-type elements on them are inserted into the back of jack 20 through the holes 27 shown in FIG. 4. The ports of the EO/OE conversion module 110 may have ferrule-type elements that are similar to the ferrule-type elements 30b' shown in FIG. 10.

When optical signals are to be transmitted from the system PCB 42 over the cable 72, electrical signals are transmitted from the EPLC IC 80 over the electrically conductive trace 93a to the EO/OE conversion module 110. The EO/OE conversion module 110 converts the electrical signals into optical signals and couples the optical signals into the end of the optical fiber 94a connected thereto. The optical signals carried on the optical fiber 94a are optically coupled via a lens element 95a into an end of a transmit optical fiber (not shown for purposes of clarity) of the cable 72. When optical signals are received in the jack 20 over a receive optical fiber (not shown for purposes of clarity) of the cable 72, the optical signals are coupled via lens element 95b into the end of the optical fiber 95b connected thereto, which carries the optical signals to the EO/OE conversion module 110. The optical signals are optically coupled out of the opposite end of the optical fiber 95b into the EO/OE conversion module 110, which converts the optical signals into electrical signals. The electrical signals are then communicated via electrically conductive trace 93b to the EPLC controller IC 80.

When electrical Ethernet signals are to be transmitted from the system PCB 42 over the cable 72, electrical signals are sent from the EPLC IC 80 over the electrically conductive traces 73a to the RJ-45 electrical circuitry (not shown for purposes of clarity) within the jack 20 and plug 10. The electrical signals are then electrically coupled from the RJ-45 electrical circuitry within the jack 20 and plug 10 onto one or more electrical wires of the cable 72. When electrical Ethernet signals are received over one or more electrical wires of the cable 72, the electrical Ethernet signals are coupled via the RJ-45 electrical circuitry of the plug 10 and jack 20 from the ends of the electrical wires of the cable 72 onto the electrically conductive traces 73b, which carry the electrical signals to the EPLC IC 80.

The manner in which the aforementioned auto-negotiation process is performed will now be described. As indicated above, the EPLC IC 80 automatically selects whether to use optical or electrical communications. This can be achieved in a manner similar to the auto-negotiation function defined in Clause 28 of, for example, the 802.3a Ethernet standards, in which the data rate capabilities of the Ethernet stations involved in the network are made known and a fixed data rate is selected through the defined exchange of electrical pulse sequences. In accordance with the invention, the auto-negotiation process is carried out on the electrical Ethernet path (1000 megabits per second (Mbps), or 10 Mbps, or 1 Mbps) to determine whether optical paths are shared among the stations in the network and therefore to be activated as the mode of communication; a specific value of the 7-bit field in the auto-negotiation base page can be defined to indicate the optical capability of a station configured similar to that depicted in either of FIG. 13 or 14. With reference to FIGS. 13 and 14, the EPLC IC 80 performs the auto-negotiation process with one or more similar or identical controller ICs located at one or more opposite ends of the link to determine whether electrical or optical communications are to be performed and then selects the appropriate mode of operations. Typically, if the opposite end of the link is configured to perform optical communications, the EPLC IC 80 will select the optical mode of operations due to the fact that they can be performed at a higher data rate; otherwise, the EPLC IC 80 will select the electrical mode of operations.

As indicated above, the plug 10 and jack 20 are backwards compatible with existing 8P8C modular connector assembly jacks and plugs. In other words, the jack 10 and plug 20 of the modular connector assembly can be mated with a jack and plug, respectively, of a typical 8P8C modular connector having typical RJ-45 wiring configurations. Thus, if a typical 8P8C plug having a typical RJ-45 wiring configuration, such as that shown in FIG. 1, for example, is mated with the jack of the invention, the modular connector assembly will operate as a typical 8P8C modular connector assembly. Similarly, if the plug of the invention is mated with a jack of a typical 8P8C modular connector assembly, the 8P8C modular connector assembly will operate in the typical manner. If, however, an optical cable or hybrid cable plug having the configuration shown in FIGS. 2A-2C is connected to a jack having the configuration shown in FIGS. 3, 4 and 6, the resulting modular connector assembly can be operated either in the optical mode or in the electrical Ethernet mode, as described above with reference to FIGS. 13 and 14. These features allow high-speed electrical or optical operations to be performed and provide the modular connector assembly with great versatility.

Figure 15:
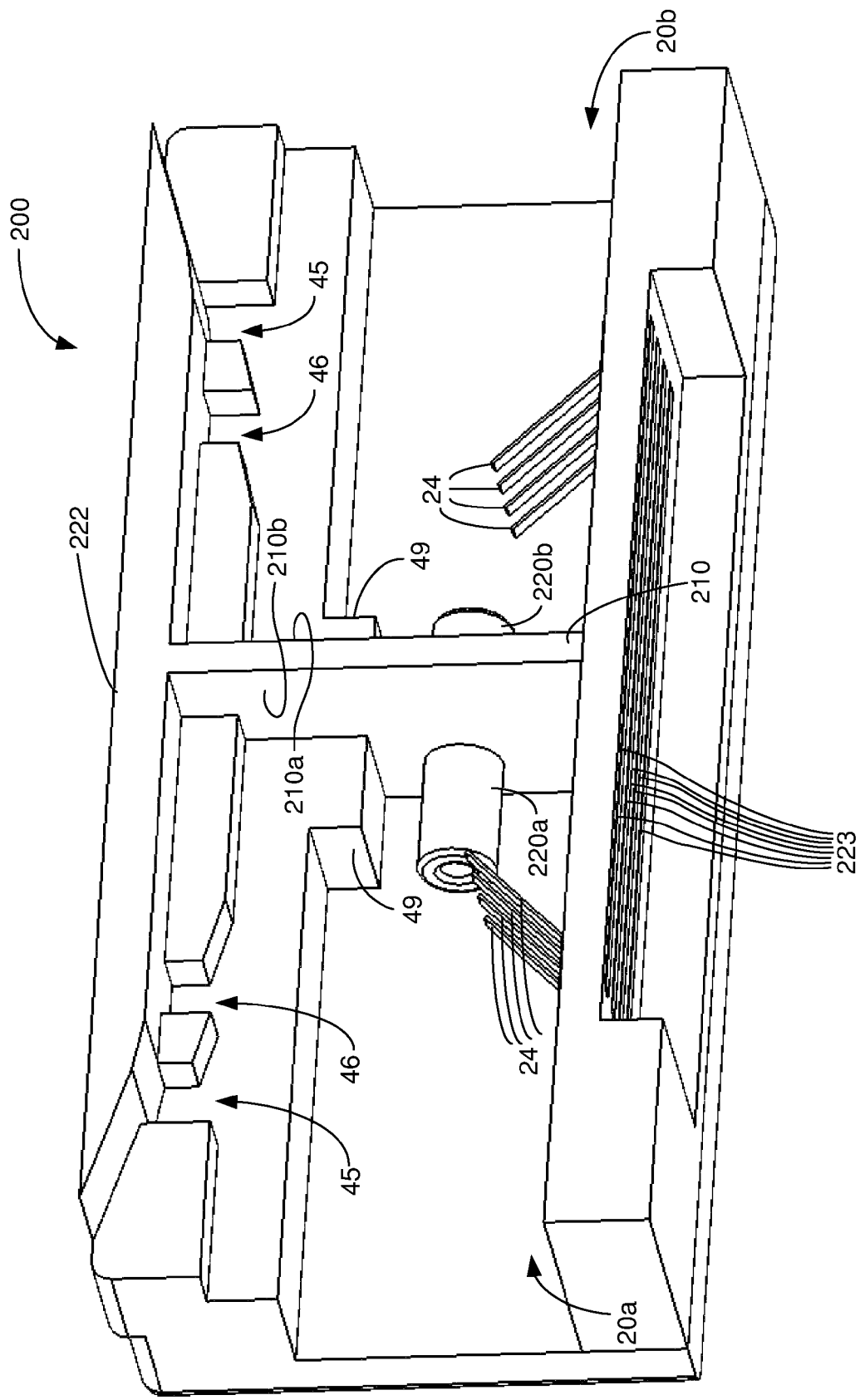
FIG. 15 illustrates a cross-sectional perspective side view of the adapter in accordance with an illustrative embodiment.
Figure 16:
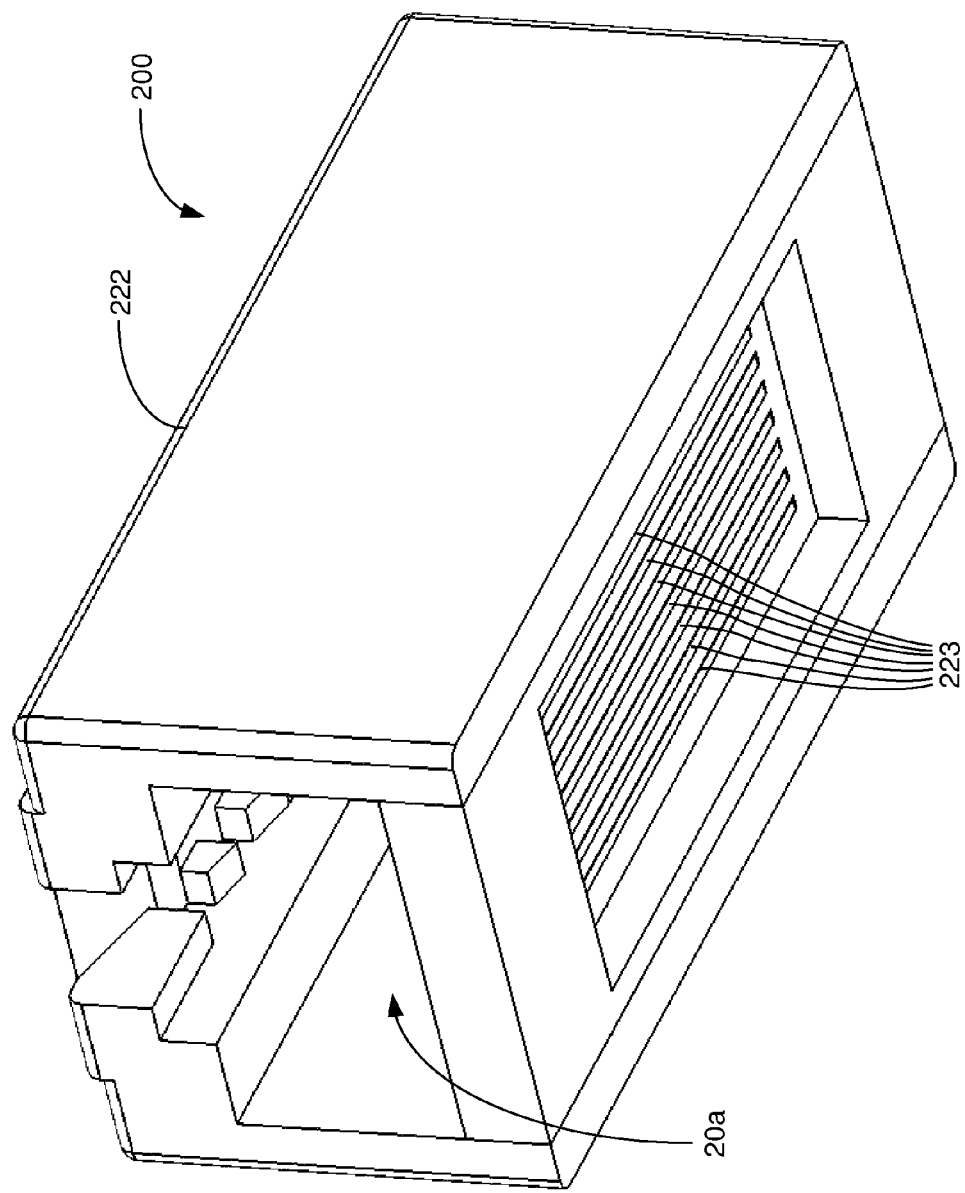
FIG. 16 illustrates a bottom perspective view of the adapter shown in FIG. 15.
Figure 17:
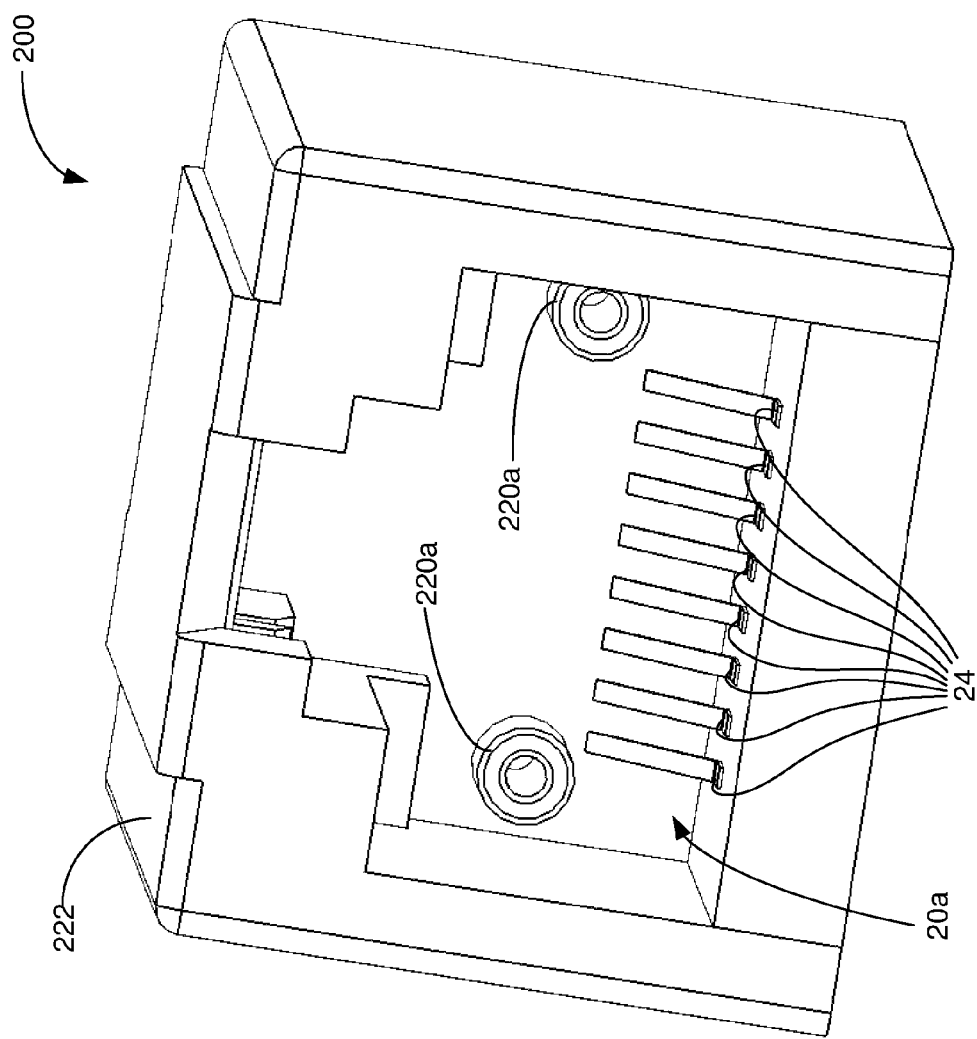
FIG. 17 illustrates a front perspective view of the adapter shown in FIG. 15.
Figure 18:
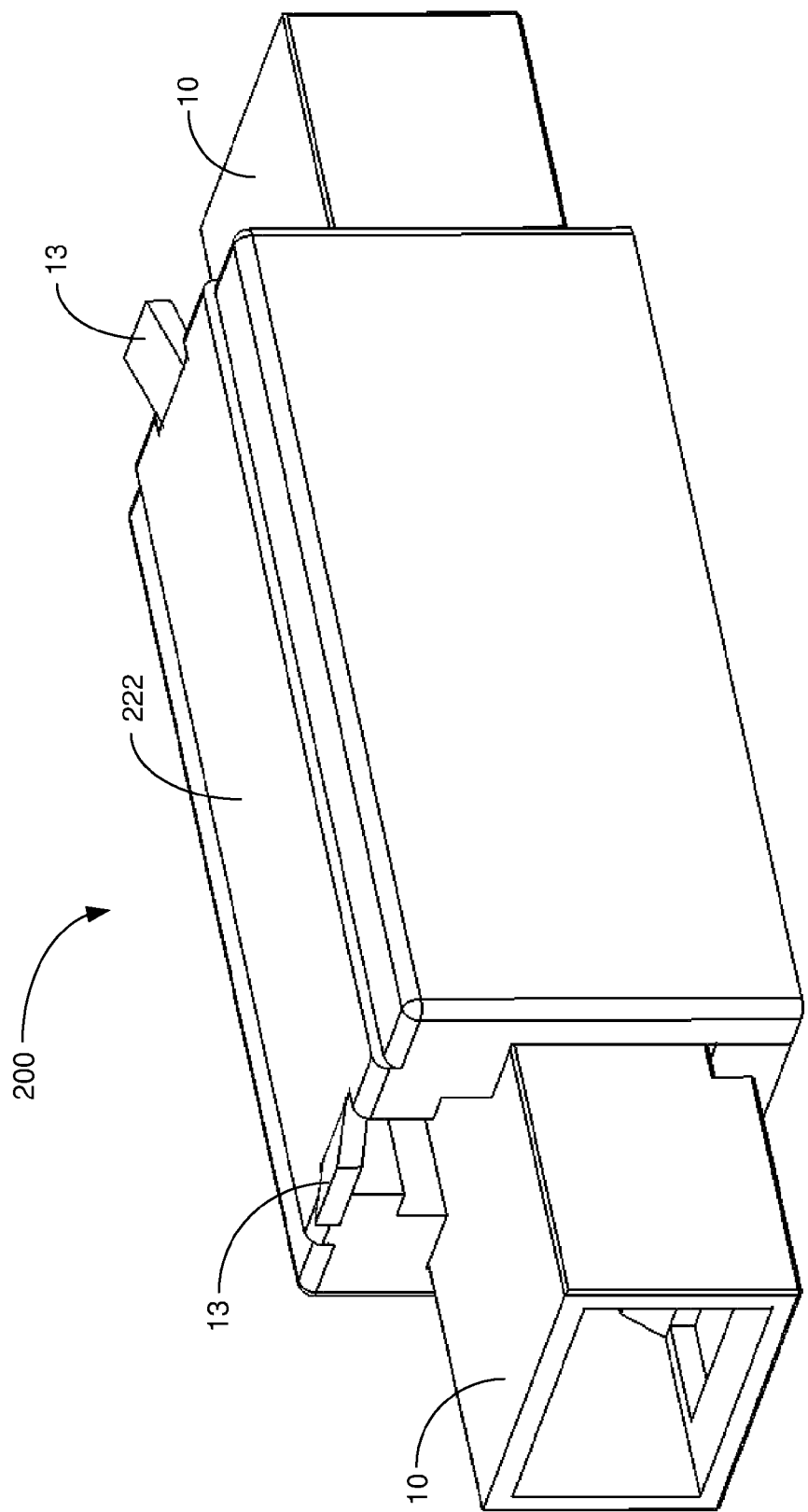
FIG. 18 illustrates a top perspective view of the adapter shown in FIG. 15 having plugs of the type shown in FIGS. 2A-2C mated therewith.
Figure 19:
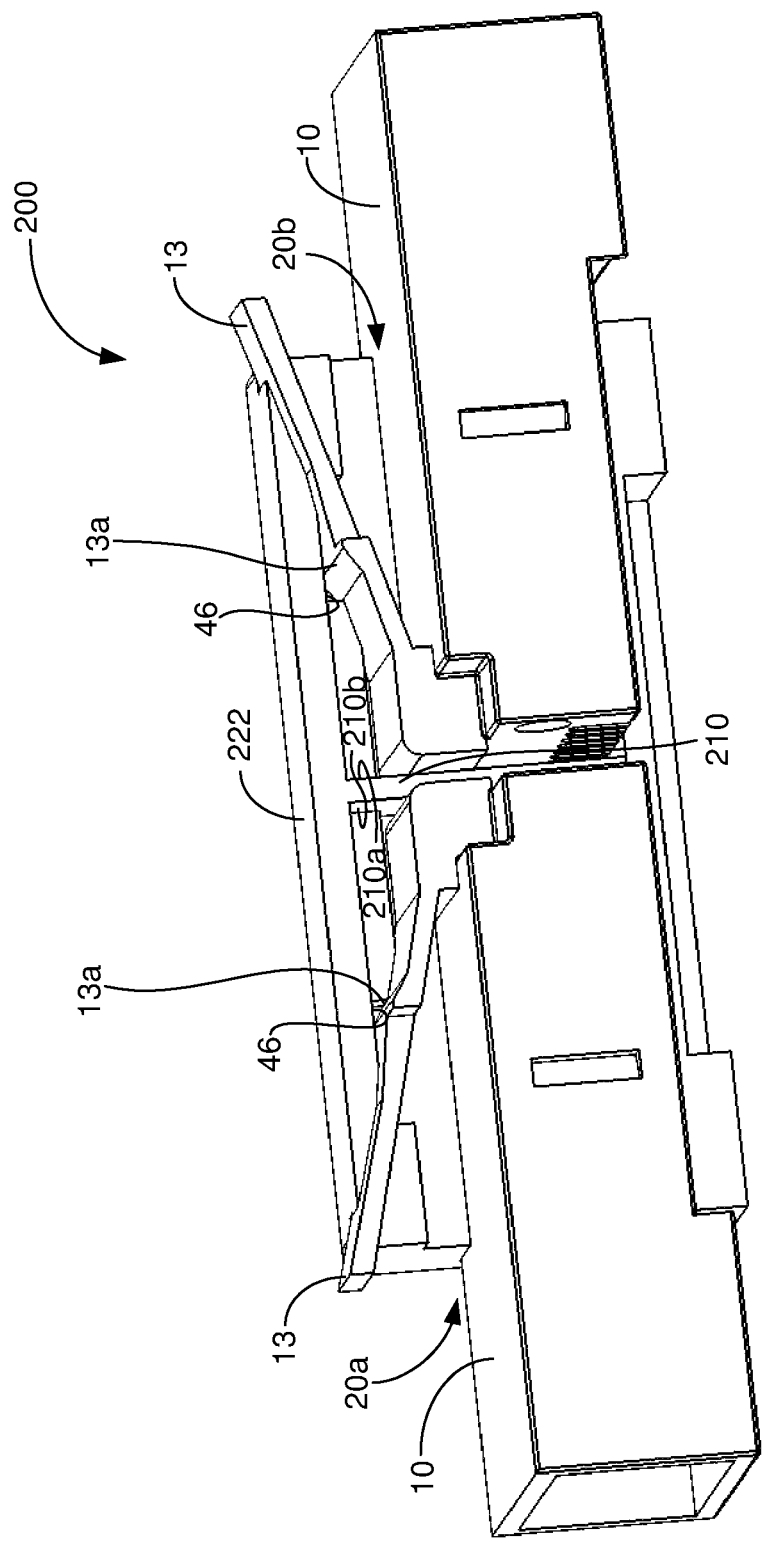
FIG. 19 illustrates a side cross-sectional view of the adapter shown in FIG. 15 having plugs of the type shown in FIGS. 2A-2C connected to the jacks of the adapter.
Figure 20:
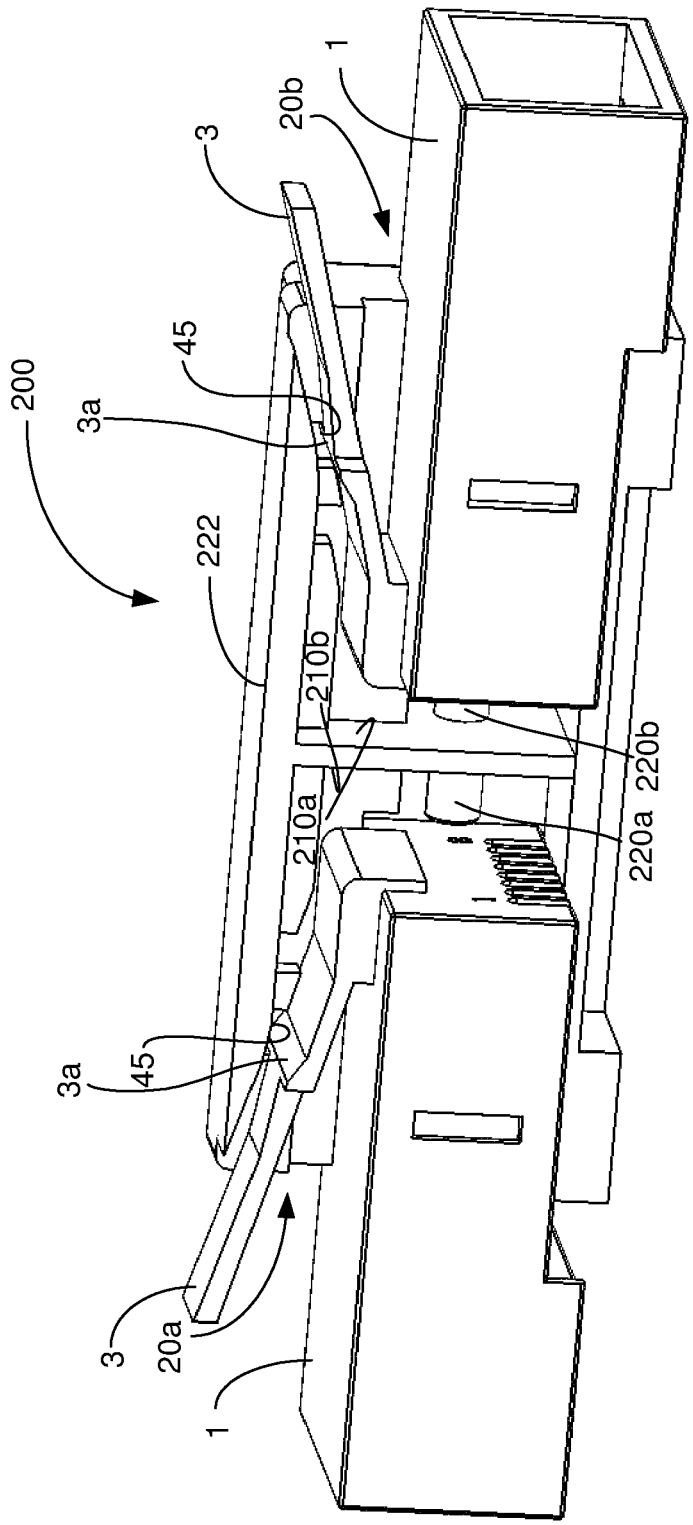
FIG. 20 illustrates a side cross-sectional view of the adapter shown in FIG. 15 having typical electrical-only RJ-45 plugs of the type shown in FIG. 1 connected to the jacks of the adapter.
Figure 21:
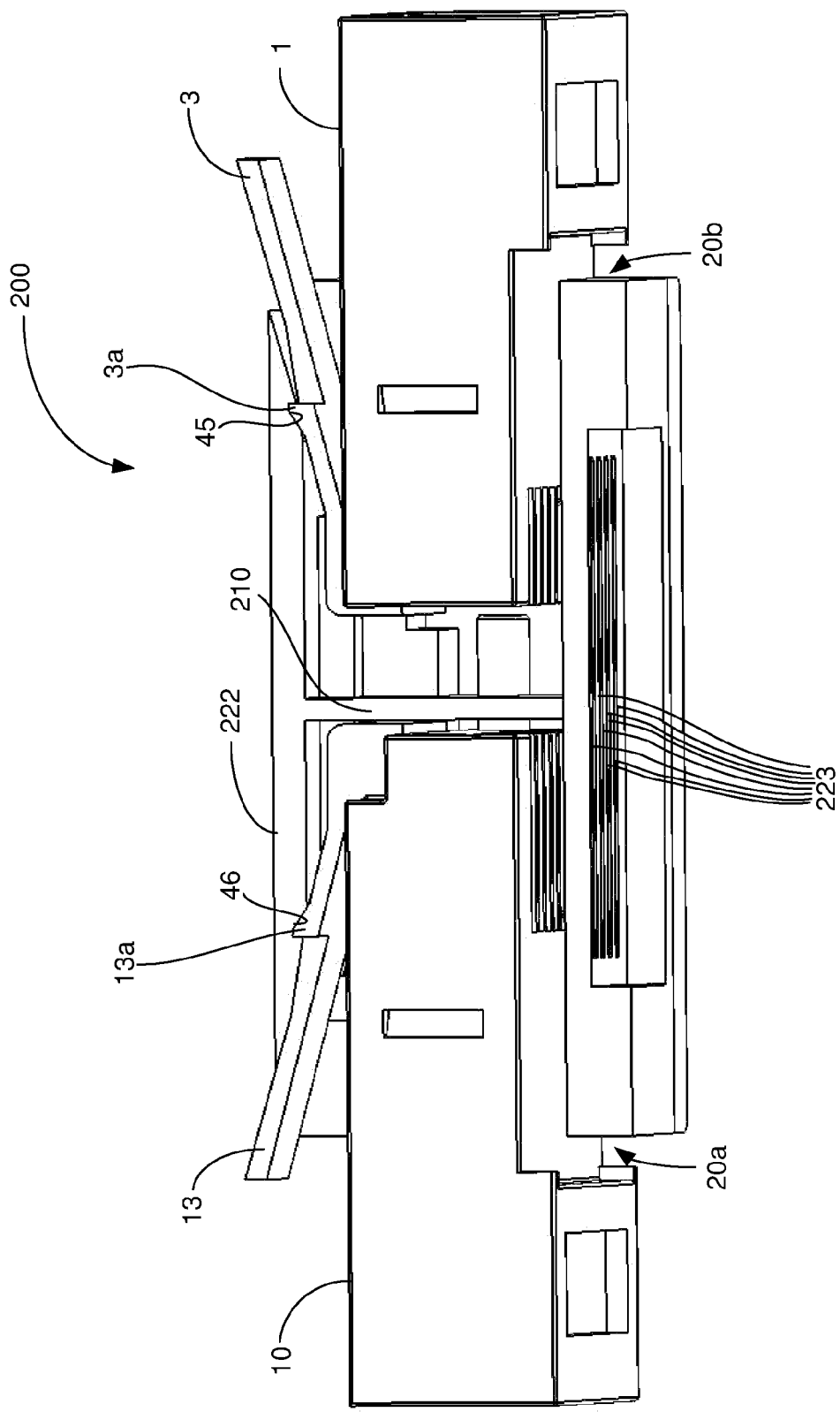
FIG. 21 illustrates a side cross-sectional view of the adapter shown in FIG. 15 having a plug of the type shown in FIGS. 2A-2C connected to one of the jacks of the adapter and having an electrical-only RJ-45 plug connected to the other jack of the adapter.

As will now be described with reference to FIGS. 15-21, the invention is directed to an adapter that provides an interface of at least two of the modular connector assemblies described above with reference to FIGS. 2A-12. FIGS. 15-21 depict an illustrative, or exemplary, embodiment of the adapter. The adapter interfaces the plugs together to allow the signals being carried on a cable (not shown for purposes of clarity) terminated by one of the plugs to be communicated onto and carried by a cable (not shown for purposes of clarity) terminated by the other of the plugs. FIG. 15 illustrates a cross-sectional perspective side view of the adapter 200 in accordance with an illustrative embodiment. FIG. 16 illustrates a bottom perspective view of the adapter 200 shown in FIG. 15. FIG. 17 illustrates a front perspective view of the adapter 200 shown in FIG. 15. FIG. 18 illustrates a top perspective view of the adapter 200 shown in FIG. 15 having plugs 10 of the type shown in FIGS. 2A-2C mated therewith. FIG. 19 illustrates a side cross-sectional view of the adapter 200 shown in FIG. 15 having plugs 10 of the type shown in FIGS. 2A-2C connected to the jacks 20*a* and 20*b* of the adapter 200. FIG. 20 illustrates a side cross-sectional view of the adapter 200 shown in FIG. 15 having typical electrical-only RJ-45 plugs 1 of the type shown in FIG. 1 connected to the jacks 20*a* and 20*b* of the adapter 200. FIG. 21 illustrates a side cross-sectional view of the adapter 200 shown in FIG. 15 having a plug 10 of the type shown in FIGS. 2A-2C connected to the jack 20*a* of the adapter 200 and having an electrical-only RJ-45 plug 1 of the type shown in FIG. 1 connected to the jack 20*b* of the adapter 200. The adapter 200 and its operations will now be described in detail with reference to FIGS. 15-21.

Like reference numerals in FIGS. 1-21 identify like elements or features. The adapter has jacks 20*a* and 20*b* formed in opposite ends thereof that receive respective plugs, such as, for example, the plug 10 shown FIGS. 2A-2C or a typical 8P8C plug of the type shown in FIG. 1 having a typical RJ-45 configuration. The first and second jacks 20*a* and 20*b* have the same configuration as the jack 20 described above with reference to FIGS. 3, 4, and 6-12 except that the back cover 25 shown in those figures is replaced in FIGS. 15-21 by a rear partitioning member 210 that is shared by the first and second jacks 20*a* and 20*b*. The shared rear partitioning member 210 has an optical coupling system 220*a* and 220*b* formed therein or otherwise secure thereto. In accordance with this illustrative embodiment, the first and second optical coupling systems are first and second sets of ferrules disposed on opposite sides 210*a* and 210*b* of the shared rear partitioning member 210. The ferrules 220*a* of the first set extend into the first jack 20*a* and the ferrules 220*b* of the second set extend into the second jack 20*b*.

In addition to the shared rear partitioning member 210, the jacks 20*a* and 20*b* share the adapter housing 222. The electrical contacts 24 disposed inside of each of the jacks 20*a* and 20*b* are interconnected by the electrical conductors 223 disposed on the underside of the adapter housing 222. The plugs 10 mate with the respective jacks 20*a* and 20*b* in the manner described above with reference to FIGS. 9-11B. In particular, as indicated above, there are first and second locking features 45 and 46 formed in the jacks 20*a* and 20*b*. The first and second locking features 45 and 46 are first and second openings, respectively, formed in an upper portion of the adapter housing 222. The first and second locking features 45 and 46 have shapes that are complementary to the shape of the locking feature 13*a* of the latch mechanism 13 of the plug 10. If the plugs 10 are inserted into the jacks 20*a* and 20*b* just far enough for the locking features 13*a* on the latch mechanisms 13 of the plugs 10 to be received in locking features 45, the plugs 10 will be interlocked with the jacks 20*a* and 20*b* in the aforementioned first interlocking position. If the plugs 10 are inserted into the jacks 20*a* and 20*b* far enough for the locking features 13*a* of the latch mechanisms 13 of the plugs 10 to be received in locking features 46, the plugs 10 will be interlocked with the jacks 20 in the aforementioned second interlocking position.

In FIG. 19, two of the plugs 10 shown in FIGS. 2A-2C are mated in the second interlocking position. As indicated above with reference to FIG. 11B, in the second interlocking position, either electrical or optical communications can be performed. If both of the plugs 10 terminate optical cables, then transmit and receive optical fibers of the cable terminated by the plug 10 that is mated with jack 20*a* are optically coupled, via the ferrules 220*a* and 220*b*, with receive and transmit optical fibers, respectively, of the cable terminated by the plug 10 that is mated with jack 20*b* to provide optical communications. If both of the plugs 10 terminate electrical Ethernet cables, then electrical wires of the Ethernet cable terminated by plug 10 mated with jack 20*a* are electrically coupled with respective electrical wires of the Ethernet cable that is terminated by plug 10 mated with jack 20*b* for electrical Ethernet communications. Both plugs 10 could also provide electrical Ethernet communications by being mated with the jacks 20*a* and 20*b* in the first interlocking position.

In FIG. 20, two standard electrical-only RJ-45 plugs 1 of the type shown in FIG. 1 are mated with the jacks 20*a* and 20*b* in the first interlocking position. As indicated above with reference to FIG. 11A, in the first interlocking position, the plugs 1 are connected to provide electrical Ethernet communications. In particular, electrical wires of the Ethernet cable (not shown for purposes of clarity) that is terminated by the plug 1 mated with jack 20*a* are electrically coupled with respective electrical wires of the Ethernet cable (not shown for purposes of clarity) that is terminated by the plug 1 mated with jack 20*b*.

In FIG. 21, a plug 10 of the type shown in FIGS. 2A-2C is mated with jack 20*a* in the second interlocking position and an electrical-only RJ-45 plug 1 of the type shown in FIG. 1 is mated with the jack 20b in the first interlocking position. Because the plug 1 is only capable of performing electrical Ethernet operations, the plug 1 will operate in the electrical mode. Although the plug 10 is shown mated with the jack 20a in the second interlocking position, the plug 10 can operate in the electrical mode when mated with the jack 20a in either the first or second interlocking position. Respective ones of the electrical contacts 24 disposed inside of each of the jacks 20a and 20b are electrically connected to each other via the electrical conductors 223 disposed on the underside of the adapter housing 222. In this way, the electrical 8P8C contact configuration of the plug 10 is electrically coupled with the electrical 8P8C contact configuration of the plug 1.

It can be seen from FIGS. 15-21 that the adapter 200 enables optical signals carried on optical cables to be coupled from one cable onto the other, and enables electrical signals carried on Ethernet or hybrid cables to be coupled from one such cable onto another such cable. In essence, each side of the adapter 200 is a modular connector assembly comprising a jack and either the plug 10 shown in FIGS. 2A-2C or some other plug, such as a typically electrical-only RJ-45 plug 1 of the type shown in FIG. 1. The optical coupling system 220a/220b optically couples the modular connector assemblies together whereas the electrical conductor configuration 223 electrically couples the modular connector assemblies together. It can be seen that the adapter 200 has backwards compatibility with existing Ethernet cables terminated by electrical-only RJ-45 plugs of the type shown in FIG. 1. These features of the adapter 200 enable it to provide great diversity and versatility with respect to the types of signals that are communicated between the assemblies, which, as will be apparent to those skilled in the art, is useful in many applications and environments.

It should be noted that the invention has been described with reference to a few illustrative, or exemplary, embodiments for the purposes of demonstrating the principles and concepts of the invention. It will be understood by persons skilled in the art, in view of the description provided herein, that many modifications may be made to the adapter 200 described herein without deviating from the principles of the invention. For example, instead of having first and second locking features 45 and 46 formed on the adapter housing 222 and a single locking feature 3a formed on the latch mechanism 13 of the plug 10, a single locking feature 45 or 46 may be formed on the housing 222 and multiple, spaced apart locking features 13a may be formed on the latch mechanism 13 of the plug 10. Other modifications may also be made to the adapter 200, as will be understood by those skilled in the art. As will be understood by those skilled in the art, all such modifications are within the scope of the invention.

What is claimed is:

1. An adapter having both optical and electrical communications capabilities, the adapter comprising:
an adapter housing, the adapter housing having first and second jacks formed therein and a shared partitioning member that partitions the first and second jacks from each other, the first jack comprising:
a first plug opening formed in a first end of the adapter, the first plug opening being configured to receive a first plug; and
a first electrical contact configuration that complies with a registered jack (RJ)-45 wiring standard;
the second jack comprising:
a second plug opening formed in a second end of the adapter, the second plug opening being configured to receive a second plug; and
a second electrical contact configuration that complies with a RJ-45 wiring standard;
an optical coupling system formed in or secured to the shared partitioning member of the adapter housing for optically coupling optical signals between a first side of the shared partitioning member and a second side of the shared partitioning member; and
an electrical conductor configuration interconnecting the first and second electrical contact configurations for electrically coupling electrical signals between the first and second electrical contact configurations,
wherein the first plug opening has at least first and second locking features located therein for engaging the first plug, wherein when the first locking feature located in the first plug opening is engaged with the first plug, the first plug is interlocked with the first jack in a first interlocking position, and wherein when the second locking feature located in the first plug opening is engaged with the first plug, the first plug is interlocked with the first jack in a second interlocking position.

2. The adapter of claim 1, wherein the first and second electrical contact configurations are first and second eight position, eight contact (8P8C) electrical contact configurations.

3. The adapter of claim 2, wherein the optical coupling system comprises first and second sets of ferrule-type elements, the first set of ferrule-type elements being formed in or secured to the first side of the shared partitioning member, the second set of ferrule-type elements being formed in or secured to the second side of the shared partitioning member.

4. The adapter of claim 1, wherein each of the plug openings is configured to receive any one of the following plugs:
a standard eight position, eight contact (8P8C) plug having an electrical contact configuration that complies with an RJ-45 wiring standard;
an optical plug having only an optical configuration; and
a hybrid plug having both an electrical contact configuration that complies with an RJ-45 wiring standard and an optical configuration.

5. The adapter of claim 1, wherein when the first plug is interlocked with the first jack in the first interlocking position an electrical connection for an electrical communication is formed.

6. The adapter of claim 1, wherein when the first plug is interlocked with the first jack in the second interlocking position an optical connection for optical communications is formed.

7. The adapter of claim 1, wherein the second plug opening has at least first and second locking features located therein for engaging at least one locking feature located on the second plug, wherein when the first locking feature located in the second plug opening is engaged with the locking feature located on the second plug, the second plug is interlocked with the second jack in a first interlocking position, and wherein when the second locking feature located in the second plug opening is engaged with the locking feature located on the second plug, the second plug is interlocked with the second jack in a second interlocking position.

8. An adapter assembly having both optical and electrical communications capabilities, the adapter comprising:
an adapter housing, the adapter housing having first and second jacks formed therein and a shared partitioning member that partitions the first and second jacks from each other, the first jack comprising:
a first plug opening formed in a first end of the adapter, the first plug opening being configured to receive a first plug; and a first electrical contact configuration that complies with a registered jack (RJ)-45 wiring standard;

the second jack comprising:

a second plug opening formed in a second end of the adapter, the second plug opening being configured to receive a second plug; and a second electrical contact configuration that complies with a RJ-45 wiring standard;

an optical coupling system formed in or secured to the shared partitioning member of the adapter housing for optically coupling optical signals between a first side of the shared partitioning member and a second side of the shared partitioning member;

an electrical conductor configuration interconnecting the first and second electrical contact configurations for electrically coupling electrical signals between the first and second electrical contact configurations;

a first plug mated with the first plug opening;

a first cable terminated on an end thereof by the first plug;

a second plug mated with the second plug opening; and a second cable terminated on an end thereof by the second plug, wherein the first plug opening has at least first and second locking features located therein for engaging the first plug, wherein when the first locking feature located in the first plug opening is engaged with first plug, the first plug is interlocked with the first jack in a first interlocking position, and wherein when the second locking feature located in the first plug opening is engaged with the first plug, the first plug is interlocked with the first jack in a second interlocking position.

9. The adapter assembly of claim 8, wherein the first and second electrical contact configurations are first and second eight position, eight contact (8P8C) electrical contact configurations.

10. The adapter assembly of claim 9, wherein the optical coupling system comprises first and second sets of ferrule-type elements, the first set of ferrule-type elements being formed in or secured to the first side of the shared partitioning member, the second set of ferrule-type elements being formed in or secured to the second side of the shared partitioning member.

11. The adapter assembly of claim 8, wherein the first and second plugs are any one of the following plugs:

a standard eight position, eight contact (8P8C) plug having an electrical contact configuration that complies with an RJ-45 wiring standard;

an optical plug having only an optical configuration; and a hybrid plug having both an electrical contact configuration that complies with an RJ-45 wiring standard and an optical configuration.

12. The adapter assembly of claim 11, wherein the first plug is the 8P8C plug and wherein the second plug is the optical plug.

13. The adapter assembly of claim 11, wherein the first plug is the 8P8C plug and wherein the second plug is the hybrid plug.

14. The adapter assembly of claim 11, wherein the first plug is the 8P8C plug and wherein the second plug is the 8P8C plug.

15. The adapter assembly of claim 11, wherein the first plug is the optical plug and wherein the second plug is the optical plug.

16. The adapter assembly of claim 11, wherein the first plug is the optical plug and wherein the second plug is the hybrid plug.

17. The adapter assembly of claim 11, wherein the first plug is the hybrid plug and wherein the second plug is the hybrid plug.

18. The adapter assembly of claim 8, wherein when the first plug is interlocked with the first jack in the first interlocking position an electrical connection for an electrical communication is formed.

19. The adapter assembly of claim 8, wherein when the first plug is interlocked with the first jack in the second interlocking position an optical connection for optical communications is formed.

20. The adapter assembly of claim 8, wherein the second plug opening has at least first and second locking features located therein for engaging at least one locking feature located on the second plug, wherein when the first locking feature located in the second plug opening is engaged with the locking feature located on the second plug, the second plug is interlocked with the second jack in a first interlocking position, and wherein when the second locking feature located in the second plug opening is engaged with the locking feature located on the second plug, the second plug is interlocked with the second jack in a second interlocking position.

* * * * *